US011549360B2

(12) United States Patent
Li et al.

(10) Patent No.: US 11,549,360 B2
(45) Date of Patent: Jan. 10, 2023

(54) SYSTEM AND METHOD FOR DIAGNOSING BOREHOLE STRUCTURE VARIANCES USING INDEPENDENT COMPONENT ANALYSIS

(71) Applicant: Baker Hughes Oilfield Operations LLC, Houston, TX (US)

(72) Inventors: Baoyan Li, Houston, TX (US); Elan Yogeswaren, Houston, TX (US); Marc Ramirez, Houston, TX (US); Freddy Mendez, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/471,525

(22) Filed: Sep. 10, 2021

(65) Prior Publication Data
US 2022/0074299 A1 Mar. 10, 2022

Related U.S. Application Data

(60) Provisional application No. 63/076,465, filed on Sep. 10, 2020.

(51) Int. Cl.
*E21B 47/005* (2012.01)
*G01V 1/50* (2006.01)
(Continued)

(52) U.S. Cl.
CPC .......... *E21B 47/005* (2020.05); *E21B 47/007* (2020.05); *G01V 1/50* (2013.01);
(Continued)

(58) Field of Classification Search
CPC ....... E21B 47/005; E21B 47/007; G01V 1/50; G01V 2210/1299; G01V 2210/1429; G01V 2210/60
See application file for complete search history.

(56) References Cited

U.S. PATENT DOCUMENTS 4,131,875 A 12/1978 Ingram
2014/0036060 A1* 2/2014 Claussen ................ G01V 1/003
348/85
(Continued)

FOREIGN PATENT DOCUMENTS

WO 2012/145113 10/2012

OTHER PUBLICATIONS

International Search Report and Written Opinion dated Dec. 23, 2021 in corresponding PCT Application No. PCT/US2021/010040.

*Primary Examiner* — Regis J Betsch
(74) *Attorney, Agent, or Firm* — Hogan Lovells US LLP

(57) ABSTRACT

A method and system to be used in well inspection. An acoustic signal is transmitted from a well inspection tool into a well structure and one or more return signals is detected using at least one receiver. At least one processor is used to generate variable density log (VDL) data that includes multiple waveforms in a time domain from the one or more return signals. A number of independent components to be used based on variances in the VDL data is determined and the multiple waveforms are decomposed into multiple components associated with one or more local structure variances of the well structure using independent component analysis (ICA) and the number of independent components. Characteristics of the well structure is determined based in part on patterns or features associated with one or more independent components from the multiple components.

20 Claims, 16 Drawing Sheets
(10 of 16 Drawing Sheet(s) Filed in Color)

(51) Int. Cl.
*E21B 47/007* (2012.01)
*G06N 20/00* (2019.01)

(52) U.S. Cl.
CPC .......... *G06N 20/00* (2019.01); *E21B 2200/20* (2020.05); *G01V 2210/1299* (2013.01); *G01V 2210/1429* (2013.01); *G01V 2210/60* (2013.01)

(56) References Cited

U.S. PATENT DOCUMENTS

2015/0233792 A1* 8/2015 Gao .................... G01M 13/028
    702/35
2018/0149019 A1  5/2018 Bose
2019/0376380 A1* 12/2019 Zhang ..................... G01V 1/50

* cited by examiner

SYSTEM AND METHOD FOR DIAGNOSING BOREHOLE STRUCTURE VARIANCES USING INDEPENDENT COMPONENT ANALYSIS

CROSS-REFERENCE(S) TO RELATED APPLICATION(S)

This application is related to and claims the benefit of priority from U.S. Provisional Application 63/076,465 that is titled SYSTEMS AND METHODS FOR DIAGNOSING BOREHOLE STRUCTURE VARIANCES OF MULTI-BARRIER WELLS USING INDEPENDENT COMPONENT ANALYSIS and that was filed on Sep. 10, 2020, the entire disclosure of which is incorporated herein for all intents and purposes.

BACKGROUND

1. Field of Invention

This disclosure relates generally to oilfield equipment and more particularly to systems and methods for evaluating cement quality through tubing or casings.

2. Description of the Prior Art

Acoustic measurements may be processed and interpreted to evaluate cement-bonding quality through tubing, particularly for plugged and abandoned (P&A) wells. For acoustic logging through tubing, energy generated by a transmitter may be confined in the tubing. This may be because of high impedance contrasting the tubing and fluid that may flow through such tubing. Variances may be noted from received waveforms after a transmission from a transmitter. Such variances may be caused by cement bonding conditions that are not significant or that may not even be observable. A drilling well is a structure formed in subterranean or underwater geologic structures, or layers. Such structures or layers incorporate pressure that may be further enhanced by supplementing borehole fluids (such as liquids, gasses or a combination) into a drill site or a well site (such as a wellbore). Wireline logging tools may be used with capability to evaluate a cement sheath or lack thereof, in an annular space behind a casing.

SUMMARY

In at least one embodiment, a method to be used in well inspection is disclosed. The method includes transmitting an acoustic signal from a well inspection tool into a well structure. One or more return signals is detected, as part of the method, using at least one receiver of the well inspection tool. At least one processor is used in the method to generate variable density log (VDL) data from the one or more return signals. The VDL data includes a plurality of waveforms in a time domain. The method includes determining a number of independent components included in the VDL data based at least in part variances identified in the VDL data. In the method, the plurality of waveforms is decomposed into multiple components associated with one or more local structure variances of the well structure using independent component analysis (ICA) and the number of independent components determined in the VDL data. The method includes determining characteristics of the well structure based in part on patterns or features associated with one or more independent components from the multiple components.

In at least one embodiment, a system to be used in well inspection is disclosed. The system includes a transmitter within a well inspection tool to transmit an acoustic signal into a well structure. At least one receiver of the well inspection tool to detect one or more return signals. The system includes at least one processor to execute instructions that cause the system to perform functions. A function performed by the system includes generating variable density log (VDL) data from the one or more return signals. The VDL data includes a plurality of waveforms in a time domain. A function of the processor is to determine a number of independent components included in the VDL data based at least in part variances identified in the VDL data. A further function of the system includes decomposing the plurality of waveforms into multiple components associated with one or more local structure variances of the well structure using independent component analysis (ICA) and the number of independent components determined in the VDL data. A further function performed by the system includes determining characteristics of the well structure based in part on patterns or features associated with one or more independent components from the multiple components.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments in accordance with the present disclosure will be described with reference to the drawings, in which:

FIG. 1A illustrates a partial cross-sectional view of a well inspection system, illustrating a well with a plurality of barriers, such as casing, tubing, cement layers, and the like.

DETAILED DESCRIPTION

Figure 1A:
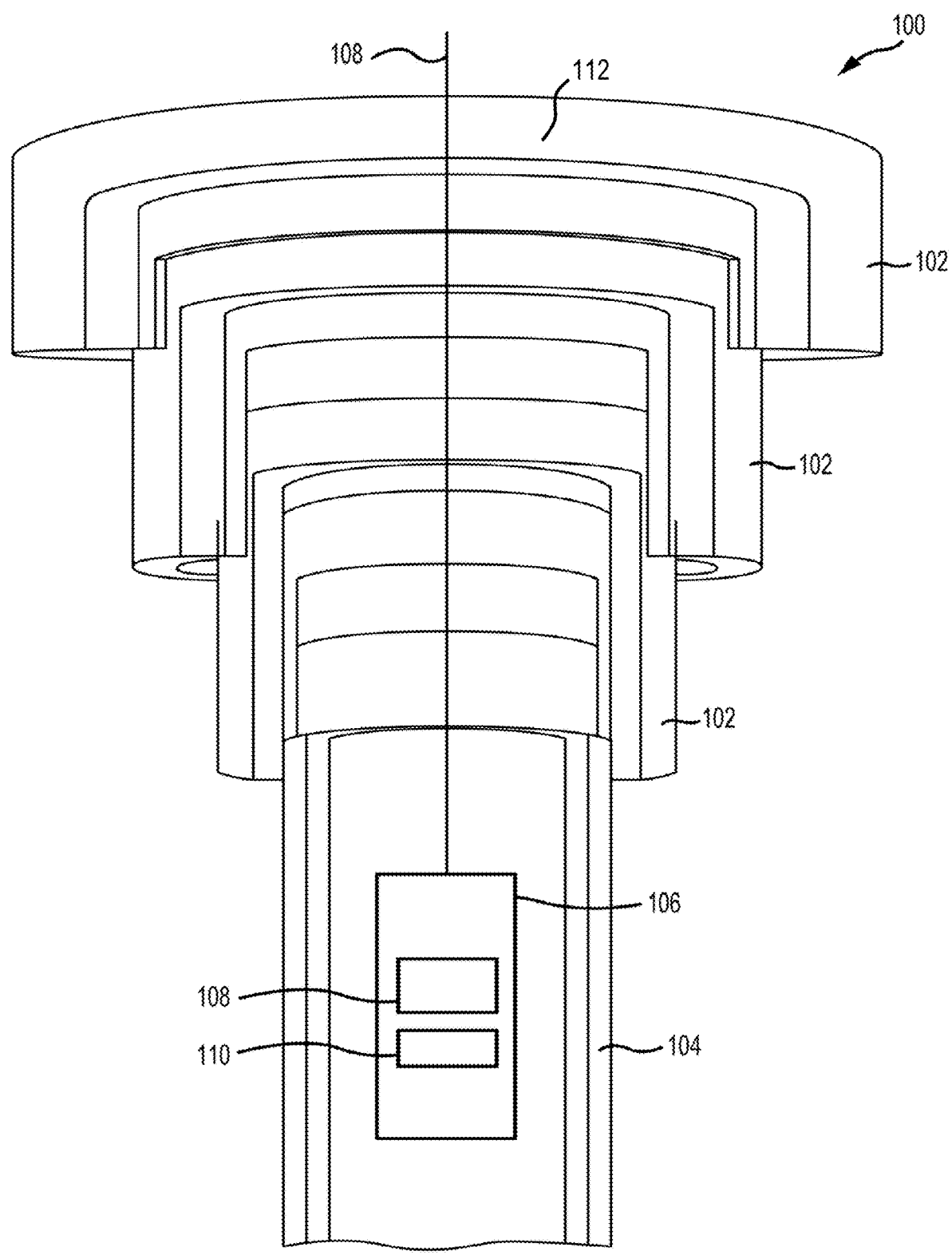

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various other functions can be implemented within the various embodiments as well as discussed and suggested elsewhere herein. In at least an aspect, the present disclosure is to a system and a method for determining characteristics of the well structure based on patterns or features associated with the time domain representation of the one or more independent components, where the one or more independent components are from a time domain decomposition previously conducted on received variable density log (VDL) data. Energy fractions or a frequency domain transformation of the one or more independent components may be used to provide further patterns or features to confirm the patterns or features associated with the one or more independent components from the time domain.

To address problem, a method and system to be used in well inspection is disclosed. The method, used with a system having a well inspection tool, includes transmitting an acoustic signal from the well inspection tool into a well structure. One or more return signals is detected, as part of the method, using at least one receiver of the well inspection tool. At least one processor is used in the method to generate variable density log (VDL) data from the one or more return signals. The VDL data includes a plurality of waveforms in a time domain. The method includes determining a number of independent components included in the VDL data based at least in part variances identified in the VDL data, such as, by using principal component analysis (PCA).

Further, in the method, the multiple waveforms may be decomposed into multiple components associated with one or more local structure variances of the well structure using independent component analysis (ICA) and the number of independent components determined in the VDL data using the PCA or other methods. As multiple components may be analyzed for reinforcing or confirming a hypothesis of the patterns or features in the time domain components, such a process may be referred to a multiple component analysis. The method includes determining characteristics of the well structure based in part on patterns or features associated with one or more independent components from the multiple components.

In a verification step, the method may further include transforming of the one or more independent components from the multiple components into a frequency domain representation (or a frequency domain spectra). Then, the characteristics of the well structure may be determined by a confirmation that frequency patterns or features in the frequency domain representation of the one or more independent component match the patterns or features associated with the one or more independent components from the multiple components that are in the time domain. In a further verification step, the method may further include determining one or more energy fractions from the one or more independent components, and then applying energy fraction patterns, from within the one or more energy fractions, to confirm the patterns or features associated with the one or more independent components.

FIG. 1A illustrates a partial cross-sectional view of a well inspection system, illustrating a well 100 with a plurality of barriers that may be well structures, such as casing 102, tubing 104, cement layers, and the like. In at least one embodiment, a time-domain analysis-based system and method is disclosed for identifying local structure variances of well structures, including for a cased-hole well. The local structure variances of a well structure may include variation of values in a time scale corresponding to a cement bonding condition, a free pipe condition, and a casing collar condition. Such conditions may further provide information associated with formation bonding and formation variances.

In at least one embodiment, such a method and system may be applicable for both fresh and mature wells. The well 100 may be any type of well, including but not limited to conventional and unconventional hydrocarbon producing wells. A well inspection tool 106 may be part of a wireline logging tool and may be deployed downhole into the well 100 to perform various wire logging functions. Such functions may include detection of various anomalies, such as well defects, eccentricity, flaw structure, topology, integrity, and other information. A well inspection tool 106 may include an acoustic based imaging device for detecting integrity and defects of the well structure. The well 100 may have one or a series of cylindrical metal casings 102 and cemented annulus layers between the casing layers 102.

Also illustrated in FIG. 1A is that a well inspection tool 106 can traverse a wellbore 112 for determining well integrity of the well 100. In some embodiments, the well inspection tool 106 can determine an integrity of each of the barriers (such as, casings and cement layers) of the well 100 and/or of a multiple annuli between the barriers. The well inspection tool 106 includes an acoustic signal generation and transmission component 108 and an acoustic return signal detection component 110. The acoustic return signal detection component 110 may be one or more receivers. The well inspection tool 106 may be deployed at the different depths inside the wellbore 112, and therefore has material and structural integrity to withstand the high pressures and high temperatures at these depths.

Figure 1B:
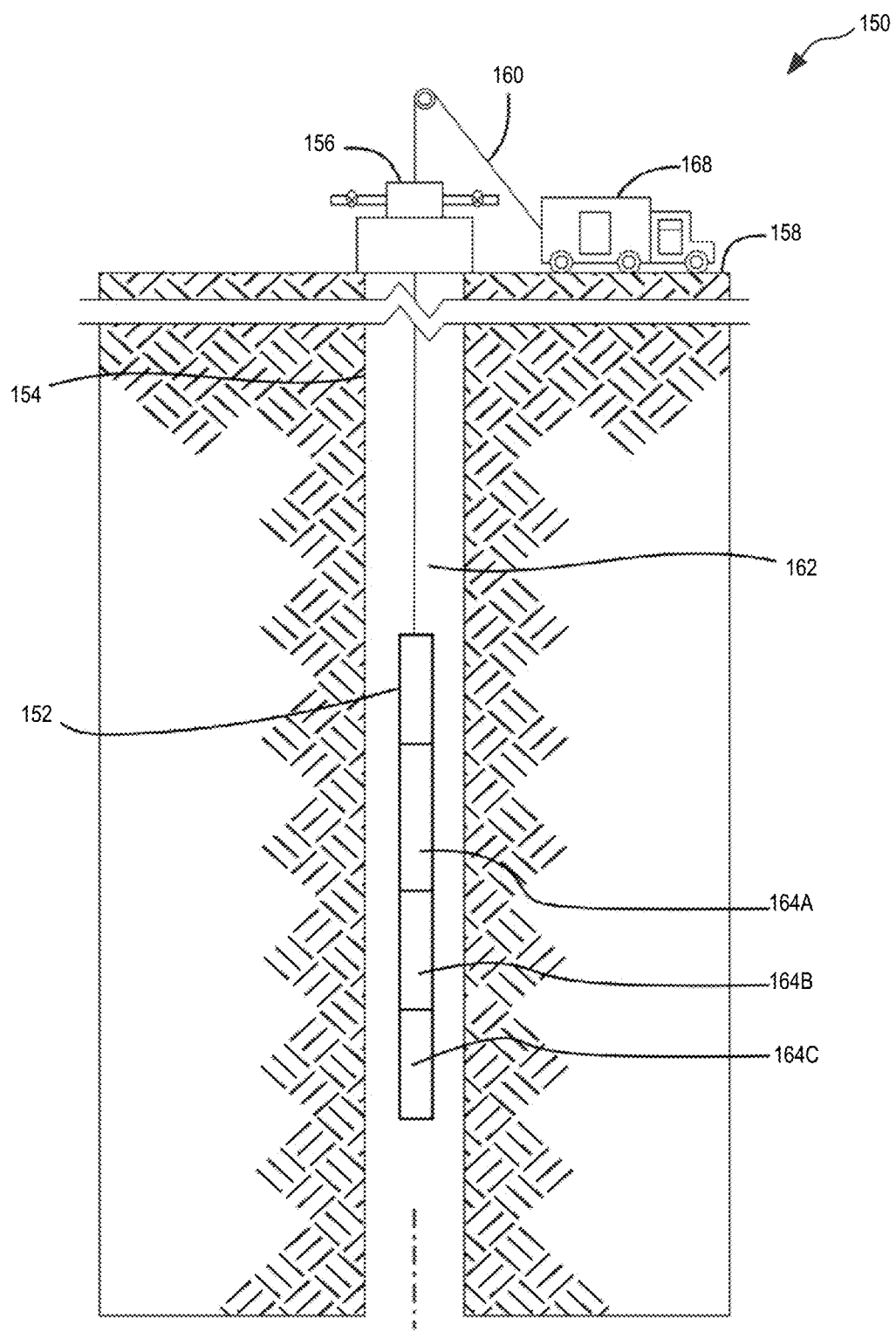
FIG. 1B illustrates an example environment subject to well inspection of at least one embodiment herein.

FIG. 1B illustrates an example environment 150 subject to well inspection of at least one embodiment herein. A system, such as for determining characteristics of the well structure, may include one or more downhole and/or platform-based tools 152. In at least one embodiment, a platform-based tool may be above terrain surface 158 (of terrain 156) or above water surface. Further, such a downhole and/or platform-based tool 152 may be part of a string 162 of tools, which may include other components utilized for wellbore operations.

In at least one embodiment, a string 162 may include other tools 164A-164C than components or may include an entire system for determining characteristics of the well structure. For example, one of such tools 164A-164C may be a well inspect tool or an entire system that includes a well inspection tool. Further, one or more of such tools may be part of or may include sensors, measurement devices, communication devices, and the like. A string 162 may include one or more tools to enable at least one of a logging operation (such as mud-gas logging), for perforating operation, or for well intervention. In at least one embodiment, nuclear logging tools, fluid sampling tools, and core sampling devices may be also used in a string 162.

In an aspect, perforating operations using one or more tools in a string may include ballistic devices being lowered into a wellbore 154 to perforate casing or the formation. Well interventions may include operations relating to analysis of one or more features of a wellbore 154, followed by performing one or more tasks in response to at least one feature. One or more features may include data acquisition, cutting, and cleaning. As such, in at least one embodiment, a string 162 may refer to a combination of one or more tools lowered into a wellbore 154. Passive devices may also be included, such as centralizers or stabilizers. In at least one embodiment, tractors may be provided to facilitate movement of a string 162.

Power and/or data conducting tools may be used to send and receive signals and/or electrical power. In addition, sensors may be incorporated into various components of a string 162 and may be enabled to communicate with a surface (platform) or with other string components. Such communication may be via a cable 160, via mud pulse telemetry, via wireless communications, and via wired drill pipe, in a non-limiting manner. Further, it should be appreciated that while embodiments may include a wireline system, a rigid drill pipe, coiled tubing, or any other downhole exploration and production methods may be utilized with at least one embodiment herein.

An environment 150 illustrated in FIG. 1B can include a wellhead assembly 166 shown at an opening of a wellbore 154 to provide pressure control of a wellbore and to allow for passage of equipment into a wellbore 154. In at least one embodiment, such equipment may include a cable 160 and a string 162 of tools. The cable 160 is or may include a wireline that is spooled from a service truck 168. The cable 160 may extend to an end of a string 162. In at least one embodiment, during operation, the cable 160 may be provided with some slack as a string 162 is lowered into a wellbore 154 to a predetermined depth.

Fluid may be delivered into a wellbore 154 to drive or assist in movement of a string 162. Such a feature may be useful where gravity may not be sufficient to assist, such as in a deviated wellbore. Furthermore, a fluid pumping system may be provided at a surface 158 to pump fluid from a source into a wellbore 154 via a supply line or conduit. A winch on a surface 158 may be used to provide control of a rate of travel of a downhole assembly and/or control of tension on a wireline 160. Such a winch system may be part of a service tuck 168. In at least one embodiment, a combination of fluid flow rate and tension on a wireline 160 can contribute to a travel rate or rate of penetration of a string 162 into a wellbore 154.

In an aspect, a provided cable 160 may be an armored cable that includes conductors for supplying electrical energy (power) to downhole devices and communication links for providing two-way communication between a downhole tool and surface devices. Further, tools such as tractors, may be disposed along a string 162 to facilitate movement of such a string 162 into a wellbore 154. Such a string 162 may be retrieved from a wellbore 154 by reeling a provided cable 160 upwards using such a service truck 168. Further, logging operations may be performed as a string 162 is brought to a surface 158.

In at least one embodiment, a system of a downhole tool 152 can include a well inspection tool for identification or differentiation of annular solids and fluids in an anisotropic casing using a combination of shear and flexural acoustic waves. In at least one embodiment, the well inspection tool is part of a class of wireline logging tools that are able to evaluate a cement or other sheathing (from materials associated there with) or lack thereof (from lack of such materials). Such sheathing is in an annular space that is behind a casing.

An issue addressed by the system and method herein is to accurately interpret sonic logs and reliably evaluate cement-bonding quality, particularly for plugged and abandoned (P&A) wells. This is beneficial because, unlike gamma ray logs, segmented cement bonding tools (SBT) logs, or casing collar locator (CCL) logs, sonic logs that may be acquired, as part of the variable density log (VDL) data of system having a well inspection tool, may include all of a borehole environment's information.

A further issue addressed is a manner to associate waveforms of such VDL data with structure variances of a cased-hole well for identifying losses associated with cement bonding in a reliable manner. This may be because the casing, formation, cement, and borehole fluid may be part of one or more arrivals that are mixed together. A filtering technique may be applied to extract the one or more arrivals (such as formation arrivals) from waveforms of the VDL data. Nevertheless, the formation arrivals may be deformed by a filter and any extracted formation signal may still be a combination of all of the formation variances.

In at least one embodiment, a system and method herein can address one or more such issue using independent component analysis (ICA) to process the VDL data in a time domain. The waveforms of the VDL data are decomposed into multiple components. Each component may be associated with one or more local structure variances of the well structure of a borehole. The ICA is in reference to the use of the different components associated with the one or more local structure variances. The decomposition may be performed using independent component analysis (ICA) and using a number of independent components determined in the VDL data based at least in part variances identified in the VDL data.

The number of independent components may be determined automatically from variances identified from a covariance matrix of the VDL data using PCA. Subsequently, the independent components can be transformed into the frequency domain to perform further analysis, such as using amplitude spectra of the independent components in the frequency domain to confirm patterns or features associated with the time domain independent components. The characteristics of the well structure, such as, formation signals in a low frequency range for confirming a good cement bonding condition or high frequency range confirming free pipe conditions may be determined from the patterns occurring and determined depth and determined time or frequency points. While the initial patterns are determined based in part on patterns or features associated with one or more time domain independent components from the multiple components of the ICA step, the initial patterns may be confirmed using patterns in the energy fractions and in the frequency spectra.

Figure 2:
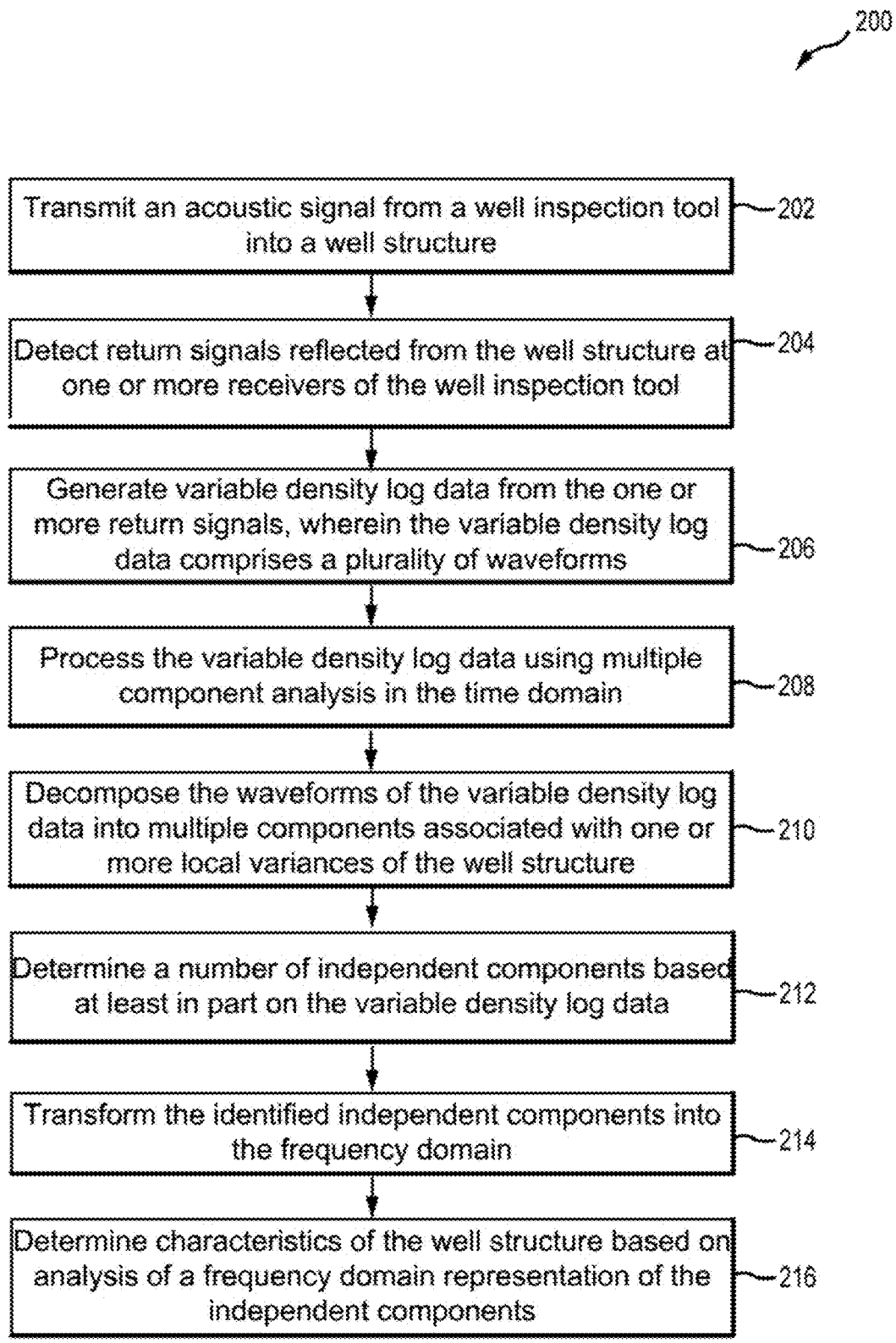
FIG. 2 is a flowchart illustrating a method of well inspection that includes diagnosing borehole structure variances using independent component analysis, in accordance with example embodiments.

FIG. 2 is a flowchart illustrating a method 200 of well inspection that includes diagnosing borehole structure variances using independent component analysis, in accordance with example embodiments. The method 200 includes transmitting (202) an acoustic signal from a well inspection tool into a well structure, detecting (204) one or more return signals at a receiver on the inspection tool, and generating (206) variable density log (VDL) data from the one or more return signals. The VDL data includes multiple waveforms.

The method 200 further includes processing (208) the VDL data using independent component analysis in the time domain. The method 200 can include decomposing (210) the waveforms of the VDL data into multiple components associated with one or more local variances of the well structure. However, the method 200 can include a step of determining (212) a number of independent components based at least in part on the VDL data before performing the decomposing (210) step. As such, the order in method 200 may be changed. In at least one embodiment, a number of independent components may be determined automatically using PCA as discussed subsequently herein. The method 200 may also include transforming (214) the independent components into the frequency domain and determining (216) characteristics of the well structure based in part on patterns or features associated with one or more independent components from the multiple components.

Further, such characteristics may be confirmed based on analysis of a frequency domain representation of the independent components. As such, steps 214, 216 may be performed to confirm patterns or features associated with previously identified in the time domain components from the decomposing steps (210), where the patterns or features of the time domain components are within one or more independent components from the multiple components. In at least one embodiment, a condition is in reference to presence or absence of specific materials, such as casing collar, cement, or borehole fluids.

In at least one embodiment, the method 200 can perform the determining step (212) for a number of components by generating a covariance matrix of the VDL data and by determining a number of independent components based at least in part on variances identified in the covariance matrix. These steps may be within a PCA method applied to the VDL data. In at least one embodiment, relationships between the independent components values and corresponding well structure characteristics may be established through historical data or lab-generated data. In at least one embodiment, the method 200 further includes analyzing the independent components using a machine learning model trained on training data of components and corresponding known well structure characteristics to identify the patterns or features in the time domain data, in the energy fractions, and in the frequency domain spectra.

Figure 3:
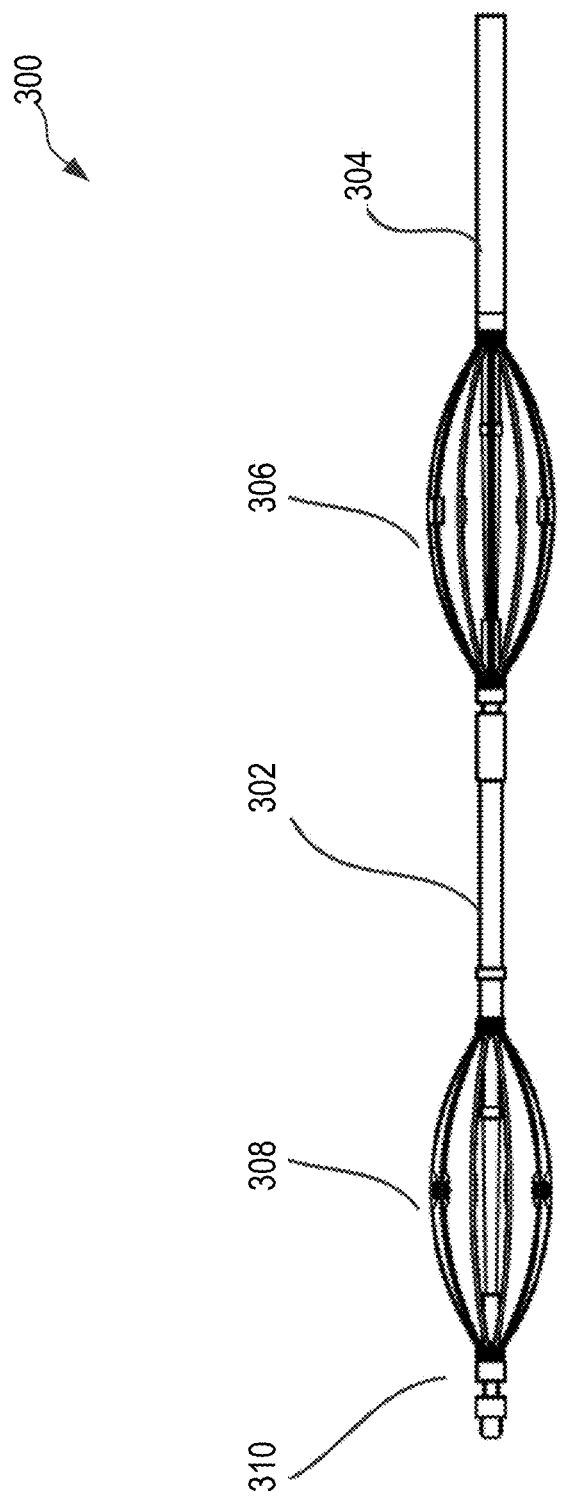
FIG. 3 illustrates a downhole tool that can include a well inspection tool forming all or part of a system to be used in well inspection, in at least one embodiment herein.

FIG. 3 illustrates a downhole tool 300 that can include a well inspection tool forming all or part of a system to be used in well inspection, in at least one embodiment herein. FIG. 3 may be taken as an illustration of a test or a maintenance tool 300 subject to improvements disclosed herein, such as, subject to including a well inspection tool thereon or therein. A tool 300 can include a downhole instrument 302 with compartments for a temperature sensor 304, a spinner array 306, a well inspection tool 308, and resistance array 310. At least some of these components may be used to collectively provide capability to evaluate a sheathing or well characteristics behind a casing of a wellbore.

A well inspection tool 308 may be coupled to an above-ground system component, such as at least one processor executing instructions from a memory to perform multiple determinations from indications associated with applied waves, for instance. In at least one embodiment, such indications may be from a reflected wave associated with applied waves. A well inspection tool 308 may use or apply an acoustic signal, from the downhole tool 300, outwards to a casing and into a cementitious material forming parts of a well structure.

The entire downhole tool 300 or a well inspection tool 308 of the downhole tool 300 may be part of a system to be used in well inspection. At least the well inspection tool 308 includes a transmitter to transmit an acoustic signal into a well structure. At least the well inspection tool 308 may include at least one receiver to detect one or more return signals. At least one processor may be provided to execute instructions to cause the system to perform functions described herein. In at least one embodiment, such a processor is part of the system or may be within at least the well inspection tool 308. However, such a processor may be part of a server 904 (as discussed with respect to FIG. 9). A function of the processor is to generate variable density log (VDL) data from the one or more return signals. The VDL data includes multiple waveforms in a time domain.

Figure 4:
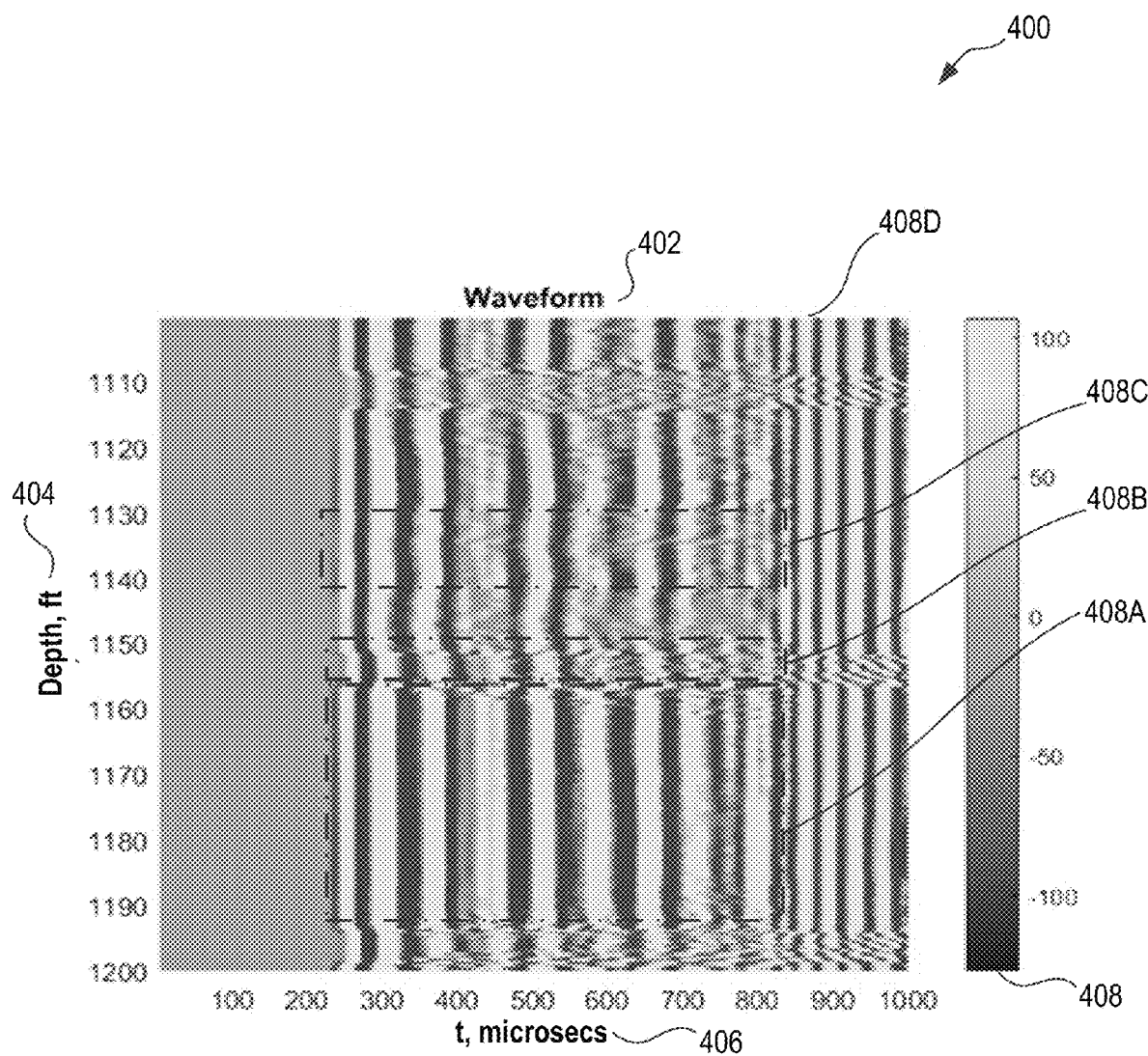
FIG. 4 illustrates a waveform that is time domain graphical view of variable density log (VDL) data showing free pipe condition, casing collar condition, and partial bonding condition, as generated by at least one processor, using one or more return signals received by at least one receiver of a well inspection tool, in at least one embodiment herein.

In at least one embodiment, an algorithm may be used for well inspection by the system having the well inspection tool. The algorithm may be in the form of the instructions stored in a memory that is associated with the system and that can be executed by the processor to perform the functions or steps herein. FIG. 4 illustrates a waveform 402 that is representative of the multiple waveforms in a time domain graphical view 400 of the VDL data. The time domain is annotated by the x-axis 406 illustrated in FIG. 4, with depths 404 at which such VDL data is received illustrated in the y-axis. Further, FIG. 4 illustrates, by the legend 408, an intensity variation in microvolts from approximately −100 mV to 100 mV that is applicable to the waveform 402 of one or more return signals received by at least one receiver. An amplitude, such as low or high, in the one or more return signals may be used to find patterns indicative of characteristics of a well structure. While the VDL data is presented as an acoustic waveform 402 against depth, it is also in the form of intensity variations, where the amplitude of the waveform is indicated in a third dimension that is a color scale different from depth and time (or frequency). Patterns or features may also, therefore, include colors from the independent components, such as, the lighter color (higher specificity) or white areas (lower specificity) in a time or frequency graph may reflect cement bonding conditions, while darker color (higher specificity) or black areas (lower higher specificity) may represent free pipe conditions.

FIG. 4 also illustrates, in the time domain, one or more local structure variances through different depths 404. For example, FIG. 4 illustrates a free pipe condition 408A, casing collar condition 408B, and partial bonding condition 408C. In at least one embodiment, the waveform 402 is generated by at least one processor, using one or more return signals received by at least one receiver of a well inspection tool 308. The waveform is illustrative of the one or more local structure variances but may not be generated in application. The data associated with the waveform 402 illustrated in FIG. 4 may be obtained by multiple steps, including a first step for loading well environmental parameters into the processor and a second step for loading the VDL data. The well environmental parameters may include well name, well location, measurement depths, borehole inner diameters (IDs), formation thicknesses, formation densities, formation porosities, formation saturations, formation matrix compositions, mud types, mud densities, borehole fluids, completion intervals, casing outer diameters (ODs), casing thickness, casing lengths, casing weights, tubing OD, tubing thickness, and tubing weight.

A further step performed by the processor, as part of obtaining the VDL data for loading into the processor or to form the waveform illustrated in the waveform 402 of FIG. 4, includes identifying casing string intervals, which have unique casing parameters. For example, the unique casing parameters may include casing OD, casing thickness, and casing weight. Another function or step enabled in the processor, for the obtaining the VDL data, is to select a depth point range, such as, $[m_s, m_e]$, for analyzing local structure variances of the well structure. A depth parameter may be set by a step where the depth parameter may be a depth counter, as given in Equation (1).

$$m_C = m_s, \tag{1}$$

The depth parameter allows the system to receive the one or more return signals at different depths, to store such signals, and to process the signals to form the graphical representations of which are illustrated in FIG. 4. A step may be performed to generate a waveform data matrix for the structure variance analysis at the $m_c$th depth, as in Equation (2).

$$X_{m_C} = \begin{bmatrix} x_{m_C - \Delta m}(t_1) & x_{m_C - \Delta m}(t_2) & & x_{m_C - \Delta m}(t_N) \\ \vdots & \vdots & & \vdots \\ x_{m_C}(t_1) & x_{m_C}(t_2) & \cdots & x_{m_C}(t_N) \\ \vdots & & & \vdots \\ x_{m_C + \Delta m}(t_1) & x_{m_C + \Delta m}(t_2) & & x_{m_C + \Delta m}(t_N) \end{bmatrix} = \begin{bmatrix} x_{m_C - \Delta m} \\ \vdots \\ x_{m_C} \\ \vdots \\ x_{m_C + \Delta m} \end{bmatrix}, \tag{2}$$

As in Equation (2), the waveform data matrix may be generated from one or more return signals at the selected ($m_c$th) depth and with inclusion of a determined number of depth points above and below the selected depth. The graphical representation in FIG. 4 is illustrative of the time domain information from such one or more return signals and is not necessarily generated during every use of the system and method herein; but the waveform data matrix may be used in processing.

Further the data from different depths and time intervals may be challenging to parse. Particularly, while the waveform data matrix may include one or more local structure variances of the well structure, for a system to be able to determine characteristics of a well structure from the waveform, decomposition to the components is performed. As such, a further function or step performed by the processor is to decompose the multiple waveforms into multiple components associated with one or more local structure variances of the well structure. Such decomposition may be performed using independent component analysis (ICA) and using a number of independent components determined in the VDL data. For example, a step or function (or sub-step or subfunction associated with the ICA step), performed by the processor, is to determine a number of independent components based at least in part on the VLD data using, for example, principal component analysis (PCA).

As such, a step or function performed by the processor to determine a number of independent components using PCA may include a singular value decomposition (SVD), as in Equation (3), on a covariance matrix formed of the waveform data matrix and given by $X_{m_C}^T X_{m_C}$:

$$X_{m_C}^T X_{m_C} = V_{m_C} \Sigma_{V,m_C} V_{m_C}^T \tag{3}$$

In Equation (3), T denotes transverse operation, $V_{m_C}$ is the matrix composed of the eigen vectors, and $\Sigma_{V,m_C}$ is singular value matrix, which is composed of variances, such as in Equation (4).

$$\Sigma_{V,m_C} = \begin{bmatrix} \sigma_{m_C,1}^2 & & & \\ & \sigma_{m_C,2}^2 & & \\ & & \ddots & \\ & & & \sigma_{m_C,2\Delta m+1}^2 \end{bmatrix}, \tag{4}$$

$$\sigma_{m_C,1}^2 > \sigma_{m_C,2}^2 > \ldots > \sigma_{m_C,2\Delta m+1}^2.$$

A step or function of the processor, as part of the PCA, includes determining first r variances that satisfy the condition in Equation (5):

$$\sum_{i=1}^{r} \sigma_{m_C,i}^2 > 95\% \sum_{i=1}^{2\Delta m+1} \sigma_{m_C,2}^2 \tag{5}$$

Once the first r variances are determined, the Equation (6) is performed to set a value for $r_{mc}$ using r, where with $r_{mc}$ represents the number of independent components for the $m_c$th depth:

$$r_{m_C} = r \tag{6}$$

A local cluster of waveforms $X_{mc}$, such as illustrated in FIG. 4, can be modeled with the $r_{mc}$ independent components using Equation (7), supported by Equations (7a) and (7b):

$$X_{m_C} = A_{m_C} S_{m_C}, \tag{7}$$

In Equation (7), $A_{mc}$ and $S_{mc}$ may be as provided in Equations (7a) and (7b):

$$A_{m_C} = \begin{bmatrix} a_{1,1}^{m_C} & a_{1,2}^{m_C} & \cdots & a_{1,r_{m_C}}^{m_C} \\ a_{2,1}^{m_C} & a_{2,2}^{m_C} & \cdots & a_{2,r_{m_C}}^{m_C} \\ \vdots & & & \\ a_{2\Delta m+1,1}^{m_C} & a_{2\Delta m+1,2}^{m_C} & & a_{2\Delta m+1,r_{m_C}}^{m_C} \end{bmatrix} \tag{7a}$$

-continued $$S_{m_C} = \begin{bmatrix} s_{1,1}^{m_C} & s_{1,2}^{m_C} & \ldots & s_{1,N}^{m_C} \\ s_{2,1}^{m_C} & s_{2,2}^{m_C} & \ldots & s_{2,N}^{m_C} \\ \vdots & & & \\ s_{r,1}^{m_C} & s_{r,2}^{m_C} & & s_{r,N}^{m_C} \end{bmatrix} = \begin{bmatrix} s_1^{m_C} \\ s_2^{m_C} \\ \vdots \\ s_{r_{m_C}}^{m_C} \end{bmatrix} \quad (7b)$$

A step for decomposing the plurality of waveforms into multiple components may be performed using independent component analysis (ICA) and the number of independent components determined by the PCA step. The method or system herein includes the use of a fast-independent component analysis (ICA) algorithm as a step or function (or sub-step or subfunction) performed by the processor. Particularly, the fast ICA may be used to compute a solution $u_1^{mc}, u_2^{mc}, \ldots, u_r^{mc}$ of the independent components $s_1^{mc}, s_2^{mc}, \ldots, s_r^{mc}$ of the local cluster of waveforms in Equation 7.

For example, an ICA algorithm can be used to determine the approximated solution the independent components $u_1^{mc}, u_2^{mc}, \ldots, u_r^{mc}$ of the independent components $s_1^{mc}, s_2^{mc}, \ldots, s_r^{mc}$. The transformation may be a first matrix that is initially assumed and is ideally an inverse of the $A_{mc}$ matrix. The waveform 402 (in its waveform data matrix representation) may be decomposed at the $m_C$th depth with the solution $u_1^{mc}, u_2^{mc}, \ldots, u_r^{mc}$ of the independent components of waveforms using Equation (8):

$$x_{m_C} = a_{m_C} U_{m_C} = \sum_{k=1}^{r_{m_C}} a_{m_C,k} u_{m_C,j} = \sum_{k=1}^{r_{m_C}} x_{m_C,k}, \quad (8)$$

Equation (8) may be also represented in the form of Equation (9):

$$U_{m_C}^T a_{m_C}^T = x_{m_C^T}, \quad (9)$$

In Equations (8) or (9), a least squared error method may be used to compute a project vector $a_{m_C}$:

$$a_{m_C}^T = (U_{m_C} U_{m_C}^T)^{-1} U_{m_C} x_{m_C}^T \quad (10)$$

$A_{mc}$ reflects a parameter that may be used for representing all the waveforms used for determining the independent components from given a set of waveforms. Separately, $a_{mc}$ reflects a parameter that is used for representing the waveform at $m_c$th depth point with the solution of independent component.

In at least one embodiment, the depth at which certain variances exist, for an application, may be used to train a machine learning model to expect certain patterns or features associated with in one or more of the time domain data, the energy fractions, and the frequency domain spectra. In one example of one application, a casing collar condition is expected at around 1155 feet (ft.). Partial cement bonding condition is expected to occur between 1135 and 1120 ft. Good cement bonding condition is expected to occur at a depth interval of 4230 and 4235 ft.

In at least one embodiment, a free pipe condition is expected to occur at a depth interval of from 1165 to 1190 ft. Other than these expected depths or depth intervals, patterns corresponding to distortions (or lack thereof—such as, for the free pipe condition) in a time domain and corresponding to each of such conditions may be also determined. Patterns, features, or distortions may be interchangeably used where the distortions are confirmed to include patterns or features that are repeatable within at least a threshold, as discussed throughout herein. For example, a shape (stripes, W, or inverted V) representing a pattern may not be exactly the same or may include uneven boundaries and variances therein. Finally, for confirmation, frequency domain patterns or features and/or energy fraction patterns or features associated may be also determined for each of such conditions, as discussed with respect to FIGS. 5B and 5C.

Furthermore, time points or intervals corresponding to when one or more return signals are received, at specified depths or depth intervals, may be also determined subsequent to the ICA process. The time and depth provide context to features of a well structure and fluid therein. For example, the marking 408D in FIG. 4 corresponds to presence of borehole fluid, where the indication is in the form of a positive part of a sinusoidal wave in one or more return signals. Part of the one or more return signals to the left of the marking 408D may be indicative of the casing collar. FIG. 4 illustrates that it takes between 870 to 1000 microseconds for a return time for one or more return signals associated with borehole fluid and takes between 270 to 850 microseconds for one or more return signals associated with the free casing (or free path) condition at the indicated depth or depth interval, but such time points, at other depths or depth intervals may refer to other conditions, including cement bonding conditions and casing collar conditions, which form the characteristics of a well structure.

In at least one embodiment, the patterns or features are illustrated in part in the graphical views of FIGS. 5A-D and 7A-D; however, the underlying values corresponding to the patterns or features, whether time points, depth points, intensity points, frequency points, and energy fraction values, may be used to train a machine learning algorithm to perform the pattern recognition features herein for inferencing the variations and then providing responses of the corresponding conditions associated with the inferred variations.

Figure 5A:
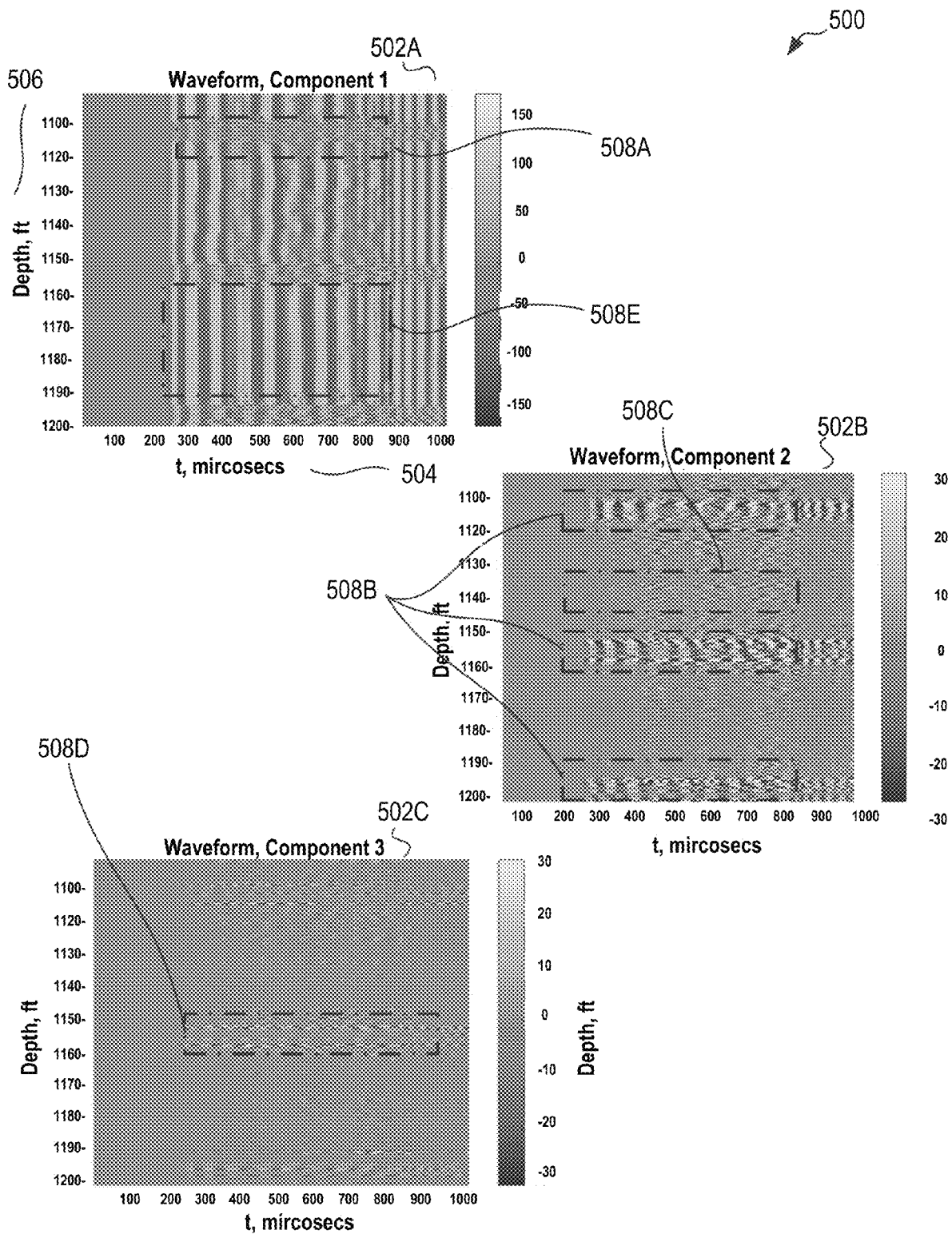
FIG. 5A illustrates time domain independent components of a waveform, such as the waveform from FIG. 4, that are associated with one or more local structure variances of a well structure, in at least one embodiment herein.

FIG. 5A illustrates, in graphical views 500, time domain independent components 502A-C of a waveform, such as the waveform 402 from FIG. 4, that are associated with one or more local structure variances of a well structure, in at least one embodiment herein. The x-axis 504, in each time domain independent components 502A-C, represents a time axis with units in microseconds, while the y-axis 506 represents different depths in the bore as to where one or more return signals have detected. As noted elsewhere herein, the illustrated time domain independent components 502A-C may be determined from the ICA algorithm, which represents all or part of the decomposing step.

The time domain independent components 502A-C may include a first independent component 502A of the waveforms. There may be less information in this component as it may vary less than an original waveform 402. For example, the first independent component 502A may include information, represented by graphical view distortions 508A. While the information in the distortions or lack thereof, indicated by markings 508A, 508E, may not be readily used in the form of the first independent component, a subsequent second independent component 502B may be used instead as distinguishing information may be further evident in the second independent component 502B.

However, in at least one application, lack of distortions from a specified depth interval 1165 to 1190 ft and at a specified time interval, such as 270 to 850 microseconds, indicated by a marking 508E, has a pattern that is of smooth stripes. This may be caused by one or more return signals having approximately same time period of return in every cycle of a wave, such as a sinusoidal wave, in the time domain. Recognition of such a pattern at such a specified time interval and depth interval may be indicative of a free pipe condition. Patterns from one or more of an energy fraction values, as in FIG. 5B, and of a frequency domain component, as in FIG. 5C may be used to confirm such a pattern recognized in the time domain.

The time domain independent components 500 may include a second independent component 502B of the waveforms. This component 502B may include information pertaining to one or more local structure variances. For example, component 502B captures where a tool enters or leaves a casing collar by distortions 508B, which is indicative of a casing collar condition. Further, the second independent component 502B may also include information pertaining to cement bonding condition, and particularly to partial cement bonding condition by a different type of distortions 508C.

In at least one application, the distortions 508B from a specified depth interval 1100 to 1120 ft and at a specified time interval, such as 270 to 850 microseconds, has a pattern that is of chevron lines or zig-zag lines. This may be caused by one or more return signals reflected by casing and casing collar, and having differing time periods of return in every cycle of a wave, such as a sinusoidal wave, in the time domain. Recognition of such a pattern at such a specified time interval and depth interval may be indicative of the casing collar condition. Patterns from one or more of an energy fraction values (from the time domain independent components), as in FIG. 5B, and of a frequency domain component, as in FIG. 5C may be used to confirm such a pattern recognized in the time domain.

In at least one application, different distortions 508C may be noted at a specified depth of 1135 ft and at a specified time interval, such as 270 to 850 microseconds. These distortions 508C may have a pattern that is of an inverted-V shape or shorter chevron or zig-zag lines. This may be caused by one or more return signals reflected by casing and casing collar, and having briefly differing time periods of return in every cycle of a wave, such as a sinusoidal wave, in the time domain. Recognition of such a pattern at such a specified time interval and depth interval may be indicative of a cement bonding condition that is likely partial cement boding. Patterns from one or more of an energy fraction values, as in FIG. 5B, and of a frequency domain component, as in FIG. 5C may be used to confirm such a pattern recognized in the time domain.

The distortions or lack thereof may be also referred to herein as patterns or features. Then, one or more neural networks or other machine learning models trained to recognize such patterns 508B, 508C, such as by being trained on training data including such patterns or features 508B, 508C illustrated by markings in the figure. Then, such one or more neural networks may be able to infer or classify newly received component data as within the depth and time intervals and having such patterns or features, as associated with a known well structure characteristic representing a free pipe condition, a casing collar condition, or a cement bonding condition.

A third independent component 502C may be determined and which is also illustrated as part of the independent components 500 in FIG. 5A. While this component 502C may not include information pertaining to one or more local structure variances in the time domain, it may include information that may be secured in other processes from such distortions 508D in the third independent component 502C. For example, as discussed with respect to at least FIG. 5B, there may be information not plainly visible but that may be extracted using energy fractions from this and other components.

Like in the manner of the other independent components 502B in FIG. 5A, one or more neural networks or other machine learning models may be trained to recognize such distortions, patterns, or features 508D, such as by being trained on training data including such distortions, patterns, or features 508D forming local structure component values, may be able to infer or classify newly received component data as corresponding to such a known well structure characteristic representing an unspecified well structure condition.

In at least one embodiment, as in the case of the time domain components, objective measures are available for the energy fraction of the independent components that may be used to confirm the distortions, patterns, or features of the time domain components in FIG. 5A. An objective measure for the free pipe intervals may be provided by multiple parameters, including a specific depth interval for an application, such as 1165 to 1190 ft; a specified time interval at the specific depth interval, such as 270 to 850 microseconds; and an identified pattern of the one or more return signals at the specified depth interval and a specified time interval.

As noted elsewhere herein, the pattern may correspond to arrival times of sinusoidal waveforms of the one or more return signals. When the one or more return signals arrive at approximately constant times relative to each prior return signal, the VDL data reflects straight stripes or bands, but when the one or more return signals arrive to the receiver at different times, then the VDL data may reflect wavy or distorted stripes. The wavy bands may be chevron or zig-zag patterns, which may be referred to herein as one type of the distortions. These distortions may be a result of lithography changes as the signals are provided therethrough and as they are returned. In at least one embodiment, an objective measure for the free pipe intervals includes patterns of straight stripes or bands formed of the one or more return signals at the specified depth interval and a specified time interval. The straight stripes or bands are not distortions relative to the chevron, zig-zag, or wavy lines forming the distortions.

Based on such pattern information, the specified depth interval (or depth), and the specified time interval, a machine learning model may be trained to recognize such distortions, such as by being trained on training data including such patterns or distortions by the arrival times at the specified depth interval (or depth), and the specified time interval. Furthermore, energy fractions of components and other features of the time or frequency domain independent components can also be used to train the neutral networks to classify and to infer various well structure conditions, such as the cement bonding conditions.

Further, such one or more neural networks may be able to infer or classify newly received component data as within such a pattern and at the specified depth interval (or depth) and the specified time interval, corresponding to a known well structure characteristic representing a free pipe condition. Such inference may be confirmed by pattern recognition applied to corresponding frequency domain components and by pattern recognition applied to corresponding energy fractions of components at the same specified depth interval (or depth) and the same specified time interval. Further, a reconstructed waveform, such as in FIG. 5D, may be generated from the independent components and the reconstructed waveform may be compared with a known waveform to ensure similarity in arrival time patterns.

Figure 5B:
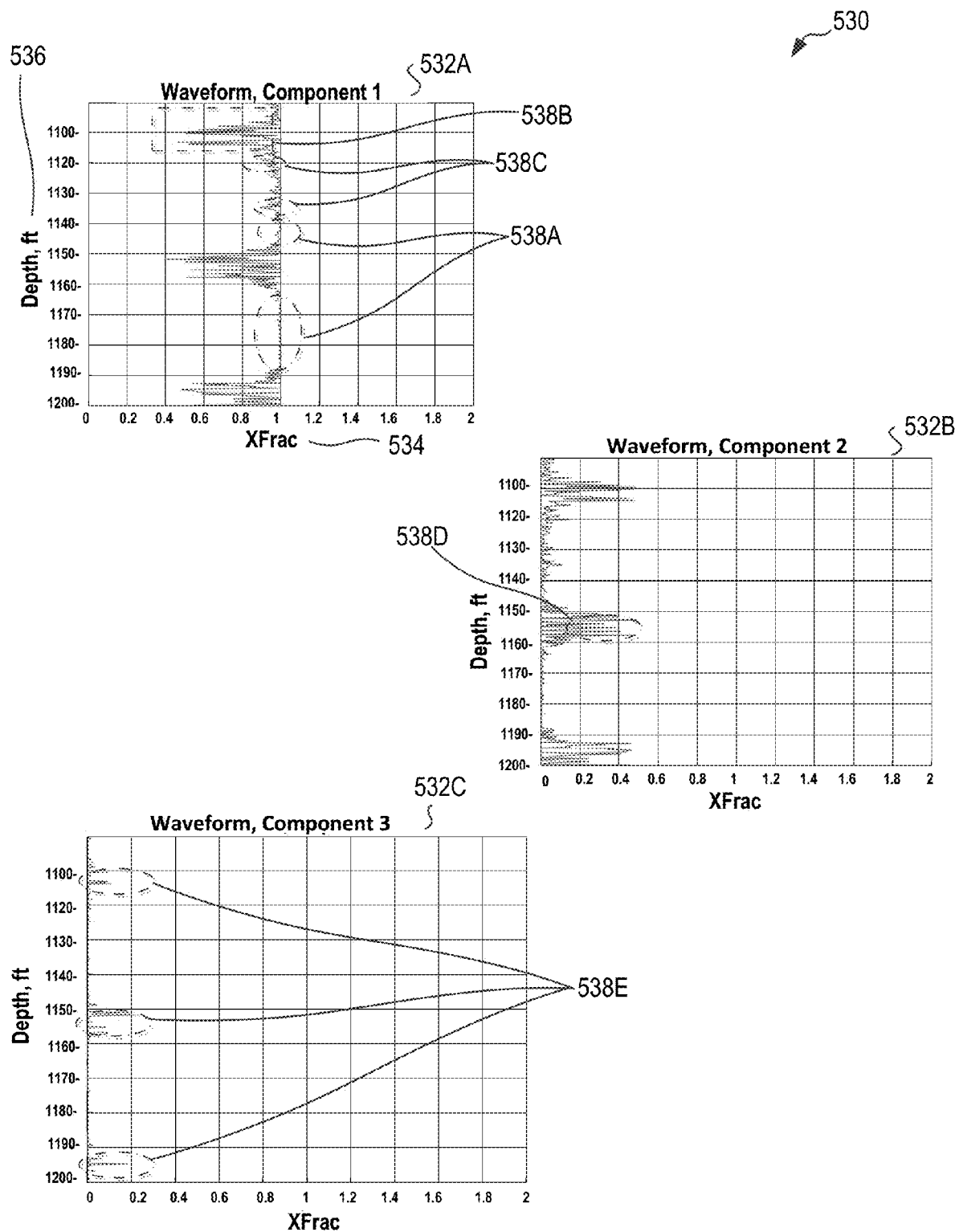
FIG. 5B illustrates different energy fractions, in graphical views, from the independent components of FIG. 5A, in at least one embodiment herein.

FIG. 5B illustrates different energy fraction graphs 532A-C of different components, in graphical views 500, from the independent components of FIG. 5A, in at least one embodiment herein. In at least one embodiment, the processor executes instructions to compute the energy fractions of the components of the waveform at the $m_C$th depth using Equation (11):

$$\chi_{m_C,k} = \frac{x_{m_C} x_{m_C,k}^T}{\sum_{j=1}^{r} x_{m_C,j} x_{m_C,j}^T}, k = 1, 2, \ldots, r_{m_C} \quad (11)$$

The components of the waveform, represented by Equation (11a), at the $m_C$th depth, may be sorted in a descending order of the energy fractions of the components of the waveform at the $m_C$th depth:

$$\{x_{m_C,k}, k=1,2,\ldots r_{m_C}\} \quad (11a)$$

Then, the depth counter may be updated as in Equation (12):

$$m_C = m_C + 1, \quad (12)$$

Further, if Equation (13) that is noted below and that pertains to a depth of inspection is satisfied, implying that all desired portions of a well are inspected, then the ICA steps or sub-steps may be stopped:

$$m_C > m_e, \quad (13).$$

Otherwise, Equation (2) may be performed for another depth point to provide a new waveform data matrix and the above steps since discussion of Equation (2) may be repeated for the new depth point. So, the waveform data matrix of Equation (2) may be formed at every depth point.

In FIG. 5B, energy fraction values 534, as computed using Equation (11) and from each of the independent components 502A-C of FIG. 5A, are plotted against depth 536 from where one or more return signals were received. The graphical views 500 are illustrative and may not be generated each time well inspection is conducted. Instead, underlying values in matrices may be used as part of the well inspection. By way of interpretation of the plot, a free pipe condition having free pipe intervals or local structure variances may be determined from the energy fraction of the first component 532A. Free pipe intervals may be indicated on the energy fraction of the first component 532A as a theoretically constant value, such as, all points 538A that is close to or at energy fraction of a first component value of "1".

However, instead of the values, which are subject to change depending on calibration of a receiver, pattern recognition is an appreciated approach to confirming any of the conditions described herein. Pertinently, a pattern recognized at the depth points 538A and having the energy fractions close to 1 is an almost linear pattern. A machine learning model trained with such a linear pattern (straight stripe) will be able to infer other linear patterns at similar depth points and energy fractions and will be able to confirm the free pipe condition previously determined from patterns within one or more independent components from the multiple components of the time domain data.

Further, casing collar conditions having casing collar intervals or variances may also be indicated on the energy fraction graph 532A of a first component, such as a first waveform component 502A. Particularly, the casing collar intervals may be indicated by all depth points 538B having energy fraction values of a first component that are much less than 1 or even lower than 0.5, in this application of a well inspection tool, but this may change in other applications of a well inspection tool. However, such values are subject to change and so, pattern recognition is an appreciated approach to confirming any of the conditions described herein. Further, in a step of calibration for the system and method herein, it is possible to adjust range of the energy fraction values of a first component to more accurately represent the casing collar intervals or variances and to subsequently detect the casing collar conditions for the well structure.

Pertinently, for casing collar conditions, a pattern recognized at the depth points 538B and having the energy fractions much less than 1 or even lower than 0.5, is a "W" pattern having two low energy fraction values and a medium energy fraction value. A machine learning model trained with such a W pattern will be able to infer other W patterns at similar depth points and energy fractions and will be able to confirm the a casing collar condition previously determined from patterns within one or more independent components from the multiple components of the time domain data.

Still further, cement boding conditions may be represented through full or partial cement bonding intervals or variances in the time domain graphical view, but may be confirmed on the energy fraction graph 532A of a first component. Particularly, the partial cement bonding intervals or variances may be indicated by all depth points 538C having energy fraction of a first component values that are less than 1 and at a specified depth, such as, at a depth of 1135 and 1120 ft. Such a partial cement boding intervals or variances may be due to different cement bonding conditions in the well structure. Here too, pattern recognition may be used instead of the first component values to confirm a cement bonding condition.

An objective measure may be established for such points 538C as having energy fraction values of a first component using a similar process as described with respect to the free pipe condition. Still further, an inverted-V shaped pattern may be expected for an energy fraction graphical view (and its underlying energy fraction values), in the specified depth interval or depth and in the specified time interval or range. However, in each of the other examples, other patterns may be observed and used for confirming a condition previously determined using the time domain independent components. Further, in a step of calibration for the system and method herein, it is possible to adjust range of the energy fraction values of a first component to more accurately represent the cement bonding intervals or variances and to subsequently detect the different cement bonding conditions for the well structure.

An energy fraction graph 532B of a second component is illustrated in the graphical views 530 that are associated with the independent components in FIG. 5B. The energy fraction of a second component 532B can provide casing collar variances from the waveforms 402 of FIG. 4, where the casing collar variances are associated with a casing collar condition. In one example, a casing collar interval may be as illustrated by points 538D that are around a depth of 1155 ft. An objective measure for the casing collar intervals may include a pattern determined for the second component using the energy fraction graph 532B of the second component, in each application of the well inspection tool and system.

In at least one embodiment, such points 538A-D in FIG. 5B may be generally distortions in the graphical views representing variances in a well structure. Like in the case of the independent components 502A-C in FIG. 5A, one or more neural networks or other machine learning models trained to recognize such distortions 538A-D, such as by being trained on training data including such distortions 538A-D, which incorporate casing collar component values or cement bonding values. Then, such one or more neural networks may be able to infer or classify newly received energy fraction values within intervals associated with the known well structure characteristic representing a casing collar condition or a cement bonding condition. This can be used to confirm the condition determined from the time domain patterns.

An energy fraction graph 532C of a third component is illustrated in the graphical views 530 that are associated with the independent components in FIG. 5B. The energy fraction graph 532C of a third component can provide unclassified (such as, subtle well structure) variances from the waveforms 402 of FIG. 4, where the unclassified variances are associated with an unclassified condition but that may be indicative of further inspection required of the area at the depth indicated in the energy fraction independent component of concern. In one example, an unclassified interval may be as illustrated by points 538E that are around any depth in the well structure. An objective measure for the unclassified intervals may include a pattern determined for the third component using the energy fraction graph 532C of the third component, in each application of the well inspection tool and system.

As can be seen from the graphical views 530, the points 538A-E represent distortions, due to local structure variances, in the one or more return signals. Such distortions may be difficult to particularly identify in a crowded plot, but energy fractions of subsequent independent components provide clarity in the separation of the points associated with different variances and therefore different conditions. Moreover, energy fractions of subsequent independent components may also reinforce learning from a prior energy fraction of a prior independent component. For example, an energy fraction of a first component includes indications of a casing collar condition, but the energy fraction of a second component also includes other indications of a casing collar condition. Therefore, multiple patterns from different energy fraction of the independent components may be used to confirm the patterns of the time domain independent components.

As such, the energy fraction is used to reinforce or confirm a hypothesis from a time domain independent component. This may be also the case for amplitude spectra determined by transforming the one or more independent components from the multiple components (of a time domain) into a frequency domain representation or spectra. In one example, one or more energy fractions or one or more features of amplitude spectra may be determined from the one or more independent components. Then, patterns are determined from the energy fractions of the one or more independent components or features from the amplitude spectra. These patterns may be used to confirm the patterns from the time domain that are within one or more independent components.

Figure 5C:
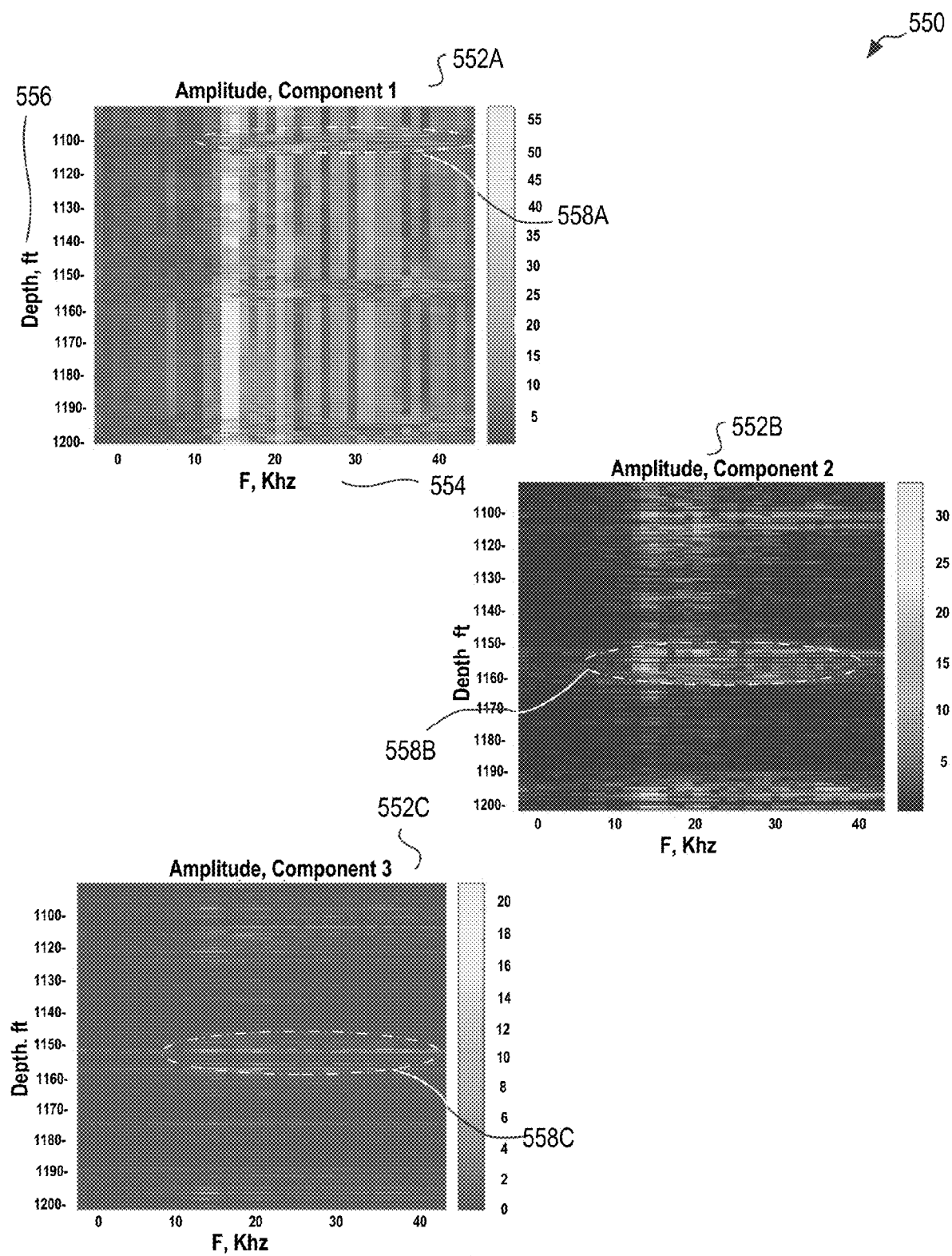
FIG. 5C illustrates, in graphical views, frequency domain independent components of a waveform, such as a transformation of the time domain independent components from FIG. 5A, in at least one embodiment herein.

FIG. 5C illustrates, in graphical views 550, frequency domain independent components 552A-C of a waveform, such as a transformation of the time domain independent components from FIG. 5A, in at least one embodiment herein. Each of the frequency domain independent components may be formed from transformation of the time domain components 502A-C is illustrated in the graphical views 500 in FIG. 5A. Particularly, the processor may be caused, by instructions, to perform a step or function for transforming one or more independent components from the multiple components into a frequency domain representation or spectra. From all such independent components of FIGS. 5A-5C, the processor can first determine characteristics of the well structure based in part on patterns within one or more time domain independent components from the multiple components of FIG. 5A, and can then confirm these characteristics based on the frequency patterns or features (FIG. 5C) in the frequency domain representation or spectra of the one or more independent components and from the one or more independent components.

At least the first frequency domain components 552A can provide information in the form of variances (distortions or points) 558A associated with cement bonding conditions of a casing. Such information may include resonant frequency that is associated with the free pipe condition of the casing or can include full width at half maximum (FWHM) of a resonant peak of the resonance frequency. Further, other ones of the frequency domain components 552B, C may provide unclassified (such as, subtle well structure) variances 558B, C from the waveforms 402 of FIG. 4, where the unclassified variances are associated with an unclassified condition, but may be indicative of further inspection required of the area at the depth indicated in the frequency domain independent component of concern. In one example, an unclassified interval may be as illustrated by points 558B, C that are around any depth in the well structure. An objective measure for the unclassified intervals may include a pattern or feature determined for such frequency domain component values that is between 10 and 40 KHz of any of the frequency domain components 552A-C.

Figure 5D:
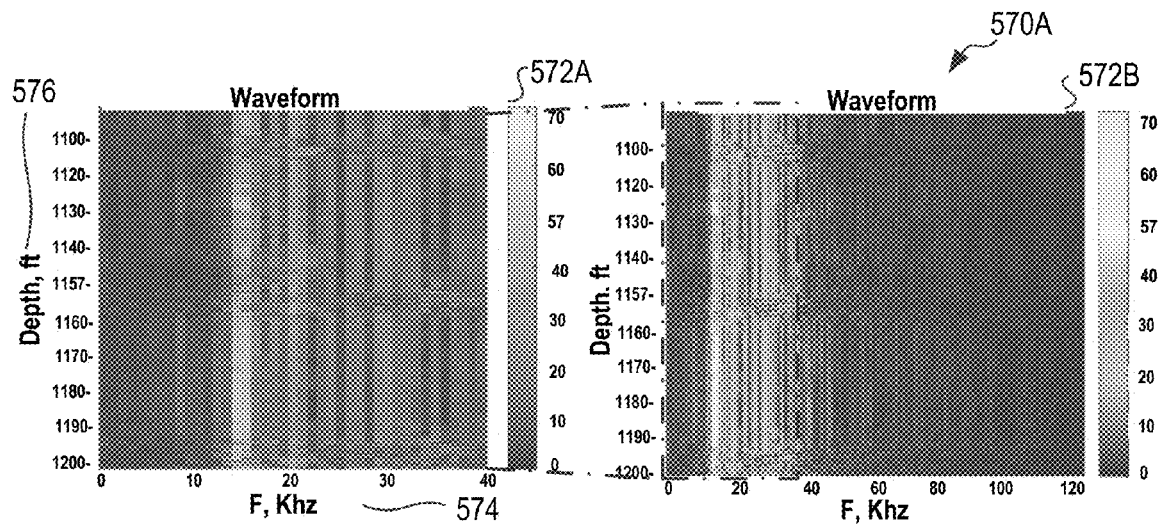
FIG. 5D illustrates zoomed-in and zoomed-out graphical views of frequency domain representations or spectra of the VDL data from FIG. 4, in at least one embodiment herein.

FIG. 5D illustrates zoomed-in 572A and zoomed-out 572B graphical views of frequency domain representations 570A of the VDL data from FIG. 4, in at least one embodiment herein. Frequency 574 is represented on x-axis in units of Kilohertz and depth 576 at which such frequency is noted is represented on the y-axis in units of feet. The zoomed-in graphical view illustrates the frequency range of focus, in an amplitude spectra, for a frequency domain component 552A-C that may be relevant to well inspection. For example, the zoomed-out graphical view 572B may not capture the distortions or variances as well as the zoomed-in graphical view 572A. As such, at least the zoomed-in graphical view 572A suggests a pattern or feature for the unclassified intervals may be provided by studying the data structure of a range of such frequency domain component values that is between 10 and 40 KHz of any amplitude spectra of the frequency domain components 552A-C.

In at least one embodiment, therefore, the characteristics determined of the well structure includes one or more of a cement bonding condition, a free pipe condition, or a casing collar condition. Particularly, good cement bonding conditions and their associated variances and intervals may be as discussed with respect to at least FIGS. 6 and 7A-D. Further, the one or more independent components can be used to determined one or more energy fractions or one or more amplitude spectra.

Furthermore, at least one processor herein can execute instructions from a memory to cause an associated system to generate a covariance matrix of the VDL data and to then determine the one or more independent components based at least in part on variances identified in the covariance matrix. For example, the number of independent components to be pursued in a well inspection tool from may derived in this manner.

Still further, at least one processor herein can execute instructions from a memory to cause an associated system to model the characteristics of the well structure into historical data, so that it can then enable further independent components and corresponding well structure characteristics to be determined using the historical data. For example, the historical data may be modified to expand its projection or inference ability when used with a machine learning model.

Figure 5E:
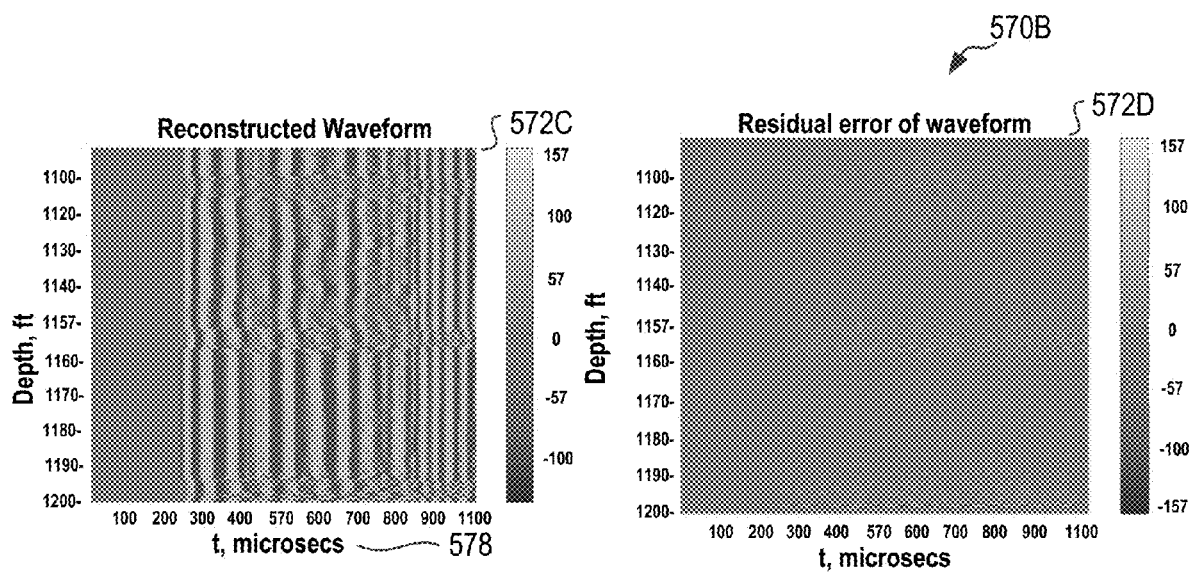
FIG. 5E illustrates a reconstructed graphical view of VDL data and a graphical view of residual error from such reconstructions using at least one of the time domain independent components from FIG. 5A as a source, in at least one embodiment herein.

In an example, at least one processor herein can execute instructions from a memory to cause an associated system to model the characteristics of the well structure into lab-generated data by variations applied to the representation of the one or more independent components to vary the characteristics of the well structure. FIG. 5E illustrates a reconstructed graphical view 572C of VDL data in a depth and time 578 plot, where such VDL data may be used to provide the time domain graphical view 402 of VDL data in FIG. 4. Different than in FIG. 4, FIG. 5E illustrates that such a time domain graphical view 572C of VDL data may be reconstructed from the independent components.

As such, it is possible to incorporate variations into the independent components to predict other conditions or to widen or narrow a range of the other conditions present in at least one actual implementation of a well inspection method and system. This allows for lab-generated data (which may include known well characteristics) to be used with at least one neural network or other machine learning model to make inferences of well conditions for new data from a well inspection tool that uses one or more return signals received by at least one receiver of the well inspection tool, in at least one embodiment herein.

Furthermore, a graphical view 572D is provided of residual error from one such reconstruction, using at least one of the frequency domain independent components, from FIG. 5C as a source, in at least one embodiment herein. This graphical view 572D illustrates that lab-generated data may be effectively used in a accurately training a machine learning model, which may then be used with a well inspection tool to enable further independent components and corresponding well structure characteristics (referred to also as known well structure characteristics) for inferencing using new data of one or more return signals.

For example, at least one processor herein can execute instructions from a memory to cause an associated system to analyze the one or more independent components using a machine learning model trained on training data of historical or lab-generated independent components. The historical or lab-generated independent components correspond to known characteristics of one or more well structures. The processor is then enabled to make inferences from the machine learning model. The inferences may be associated with the characteristics of the well structures based in part on one or more known characteristics of a plurality of well structures.

In an example, at least one processor herein can execute instructions from a memory to cause an associated system to use VDL data that includes raw data from multiple receivers. The raw data may be stored for use as historical data or modified for use as lab-generated data. The historical data or the lab-generated data can be used to generate further independent components that correspond to further well structure characteristics. Subsequently, responses associated with such characteristics may be modeled into the historical or lab-generated data. Such responses include variations applied to the representation of the one or more independent components to vary the characteristics of the well structure As such, an aspect herein is to model responses associated with the characteristics of the well structure into historical data and to enable further independent components and corresponding well structure characteristics to be determined using the historical data. Another aspect herein is to model responses associated with the characteristics of the well structure into lab-generated data by variations applied to the representation of the one or more independent components to vary the characteristics of the well structure. Then, the further independent components and corresponding well structure characteristics can be determined using the lab-generated data. These aspects enable simulated depth and time intervals, patterns or features, and associated characteristics for a well structure.

In an example, at least one processor herein can execute instructions from a memory to cause an associated system to use the one or more local structure variances of the well structure that include variation of values in a time scale corresponding to a cement bonding condition, a free pipe condition, and a casing collar condition. In an example, at least one processor herein can execute instructions from a memory to cause an associated system to determine variances in the VDL data using at least different components therein. Then, such a processor can determine the one or more independent components based in part on the variances.

Figure 6:
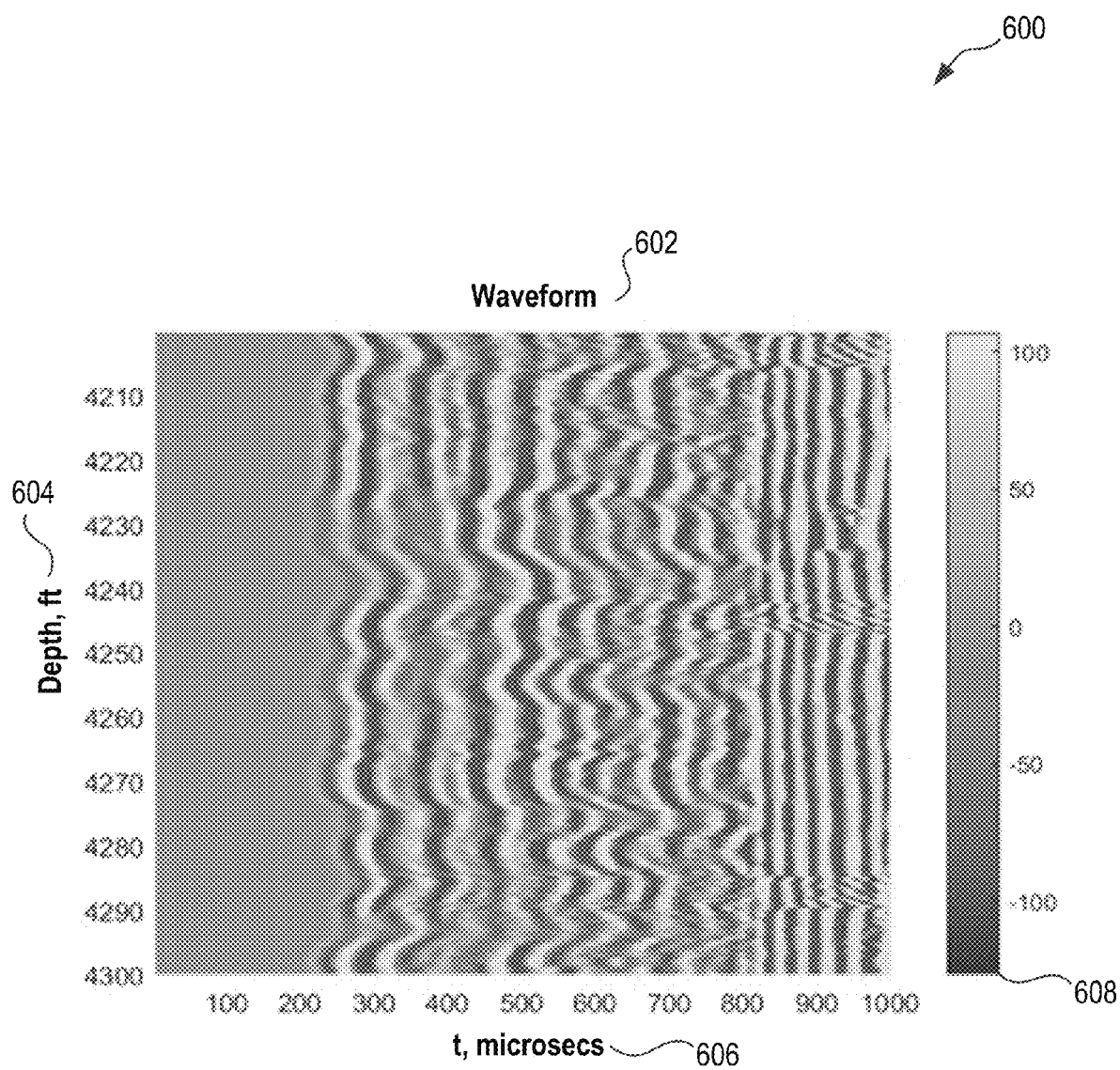
FIG. 6 illustrates a waveform that is time domain graphical view of variable density log (VDL) data showing good cement bonding condition, as generated by at least one processor, using one or more return signals received by at least one receiver of a well inspection tool, in at least one embodiment herein.

FIG. 6 illustrates a waveform 602 that is time domain graphical view of variable density log (VDL) data showing good cement bonding condition, as generated by at least one processor, using one or more return signals received by at least one receiver of a well inspection tool, in at least one embodiment herein. Like discussed with respect to FIG. 4, the time domain is annotated by the x-axis 606 illustrated in FIG. 4, with depths 604 at which such VDL data is received illustrated in the y-axis. Further, FIG. 6 illustrates, by the varying greyscale in the legend 608, an intensity (in microvolts from approximately −100 mV to 100 mV) of the waveform 602 of one or more return signals received by at least one receiver. The discuss in FIG. 4 applies here as well, other than the underlying data, such as the VDL data being predominantly related to good cement bonding conditions.

FIG. 6 also illustrates that formation arrivals, such as of variant lithography therein, which can be differentiated from arrivals of a casing collar; and further, that underlying data demonstrate features (depths, times, and patterns) of the waveforms 602 that are associated with good cement bonding condition. For example, independent components of such waveforms 602 may be obtained from a decomposition step and then patterns in the independent components may be used to train a machine learning model at least a good cement bonding condition from a casing collar condition for a well structure.

Figure 7A:
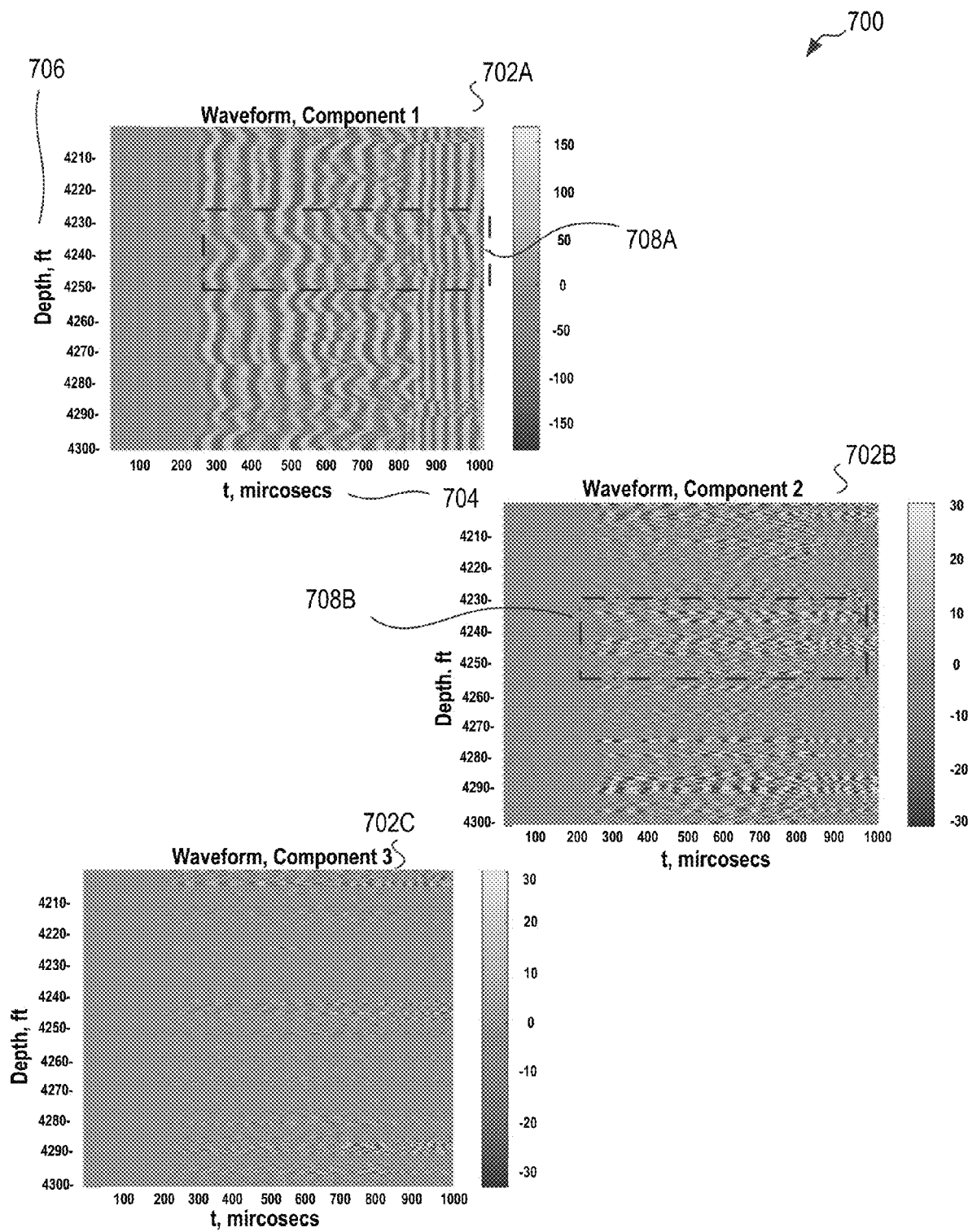
FIG. 7A illustrates time domain independent components of a waveform, such as the waveform from FIG. 6, that are associated with one or more local structure variances of a well structure, in at least one embodiment herein.

FIG. 7A illustrates, in graphical views 700, time domain independent components 702A-C of a waveform, such as the waveforms 602 from FIG. 6, that are associated with one or more local structure variances of a well structure, in at least one embodiment herein. The discussion with respect to FIG. 5A, as to how such time domain independent components are generated or used, is applicable herein. However, the waveforms 602 are from a different depth than in FIG. 5A, and its associated patterns may particularly correspond to good cement bonding conditions expected at one or more depths in the interval expressed in the y-axis of FIG. 7A.

The x-axis 704, in each time domain independent components 702A-C, represents a time axis with units of microseconds, while the y-axis 706 represents different depths in the bore as to where one or more return signals from the formation have been detected. As noted elsewhere herein, the illustrated time domain independent components 702A-C may be determined from the ICA algorithm and from a determined number of components as noted herein, which represents all or part of the decomposing step.

The time domain independent components 702A-C may include a first independent component 702A of the waveforms. There may be less information in this component as it may vary less than an original waveform 702. For example, the first independent component 702A may include information, represented by graphical view distortions 708A. While the information in the distortions 708A may not be readily used in the form of the first independent component, it may be used in a second independent component 702B as discussed subsequently.

The time domain independent components 700 may include a second independent component 702B of the waveforms. This component 702B may include information pertaining to one or more local structure variances. For example, component 702B captures where a tool enters or leaves a casing collar by distortions 708B. This component 702B can also be used to identify variances of low frequencies caused by formation for good cement bonded condition.

Then, one or more neural networks or other machine learning models trained to recognize such distortions 708B, such as by being trained on training data including such distortions 708B. Then, such one or more neural networks may be able to infer or classify newly received component data as within intervals of a known well structure characteristic representing a casing collar condition or a good cement bonding condition.

A third independent component 702C may be determined and which is also illustrated as part of the independent components 700 in FIG. 7A. While this component 702C may not include information pertaining to one or more local structure variances in the time domain, it may include information that may be secured in other processes from such distortions 708D in the third independent component 702C. For example, as discussed with respect to at least FIG. 7B, there may be information not plainly visible but that may be extracted using energy fractions from this and other components.

Figure 7B:
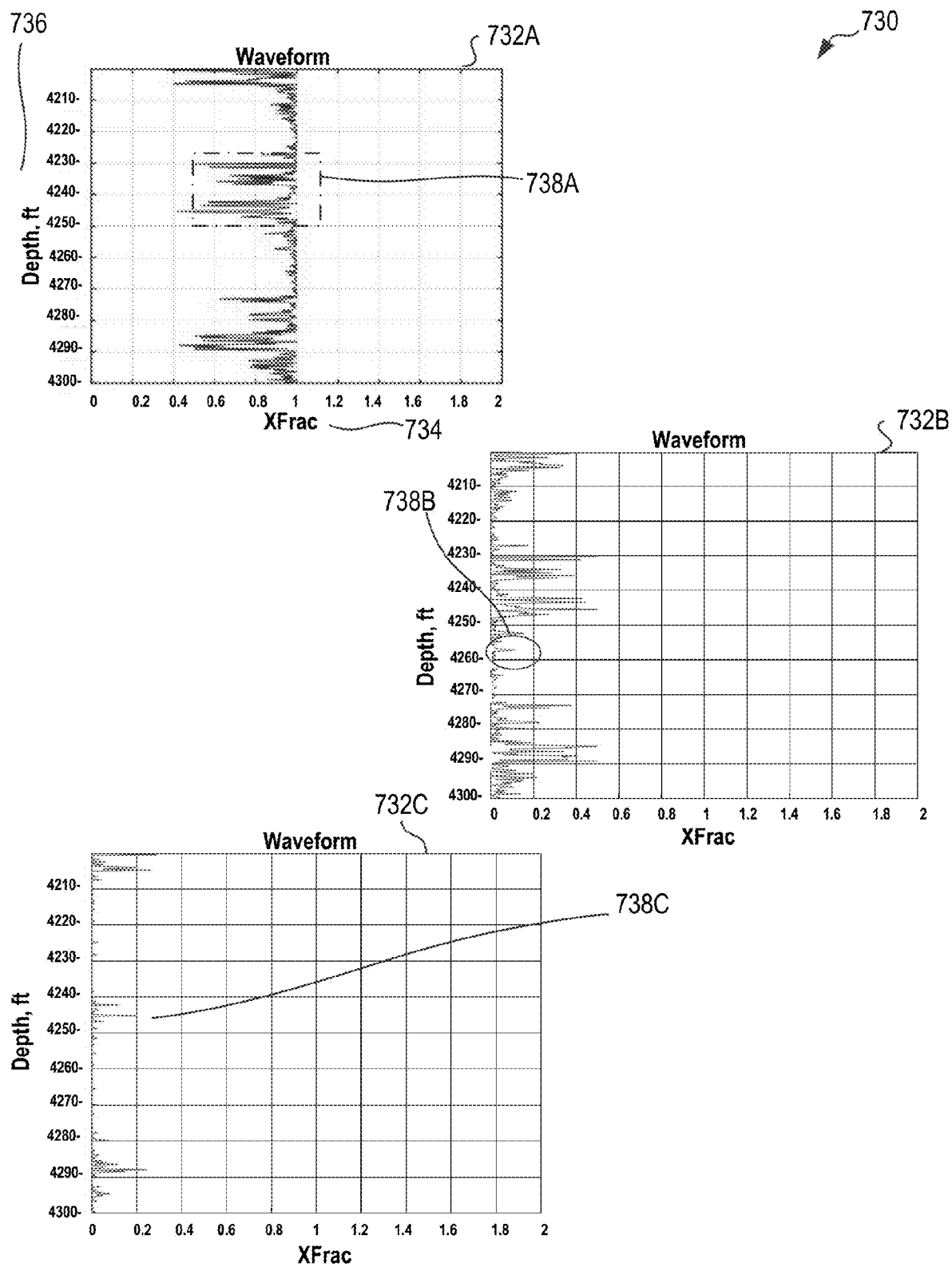
FIG. 7B illustrates different energy fraction, in graphical views, from the independent components of FIG. 7A, in at least one embodiment herein.

Like in the manner of the other independent components 702B in FIG. 7B, one or more neural networks or other machine learning models may be trained to recognize such distortions, patterns, or features 708A, B, such as by being trained on training data including such distortions 708B forming casing collar component values, may be able to infer or classify newly received component data as corresponding to such a known well structure characteristic representing a casing collar condition.

FIG. 7B illustrates different energy fractions 732A-C, in graphical views 730, from the independent components of FIG. 7A, in at least one embodiment herein. In at least one embodiment, the processor executes instructions to compute the energy fractions of the components of the waveform using Equation (11) noted herein. In FIG. 7B, energy fraction values 734, as computed using Equation (11) and from each of the independent components 702A-C of FIG. 7A, are plotted against depth 736 from where one or more return signals were received. The graphical views 700 are illustrative and may not be generated each time well inspection is conducted. Instead, underlying values in matrices may be used as part of the well inspection. By way of interpretation of the plot, unlike a free pipe condition having free pipe intervals or local structure variances, as in FIG. 5B, a good cement bonding condition is provided. As such, 3. unlike the free pipe condition of FIG. 5B, the energy fraction graph 732A of a first component in FIG. 7B illustrates good cement bonding condition and can never be a constant.

For example, for a good cement bonding condition, the first energy fraction values of a first component are less than 1 and are not constant at a value that is less than one, as the depth changes at least per feet. This may be due to local lithology variances of such formations. Further, this is illustrated at a depth interval of 4230 and 4235 ft. in the energy fraction of a first component 732A. Good cement bonding condition may be indicated on the energy fraction graph 732A of a first component as a changing value that is less than 1 and particularly by using a pattern that has all points 738A marked in the energy fraction graph 732A of a first component.

An energy fraction graph 732B that is associated with the independent components of FIG. 7A is illustrated in the graphical views 730 of FIG. 7B. The energy fraction graph 732B of a second component can provide casing collar variances from the waveforms 602 of FIG. 6, where the casing collar variances are associated with a casing collar condition. In one example, a casing collar interval may be as illustrated by points 738B. An objective measure for the casing collar intervals may be provided by a determined depth range and time range of such energy fraction values 738B of a second component and by a pattern formed by the points 738B marked in FIG. 7A.

In at least one embodiment, such points 738A in FIG. 7B may be generally distortions in the graphical views representing variances in a well structure. Like in the case of the independent components 702A-C in FIG. 7A, one or more neural networks or other machine learning models trained to recognize patters in such distortions 738A, B, such as by being trained on training data including such distortions 738A, B, which incorporate casing collar component values or good cement bonding values. Then, such one or more neural networks may be able to infer or classify newly received time domain component data within intervals associated with the known well structure characteristic representing a casing collar condition or a good cement bonding condition.

An energy fraction graph 732C of a third component, such as from FIG. 7A, is illustrated in the graphical views 730 associated with FIG. 7B. The energy fraction graph 732C of a third component can provide unclassified (such as, subtle well structure) variances from the waveforms 602 of FIG. 6, where the unclassified variances are associated with an unclassified condition or with formation signals, which may be indicative of further inspection required of the area at the depth indicated in the energy fraction of an independent component of concern. In one example, an unclassified interval may be as illustrated by points 738C that are around any depth in the well structure. An objective measure for the unclassified intervals may be provided by a range of such energy fraction graph 732C values of a third component that forms a pattern determined for the unclassified intervals.

As can be seen from the graphical views 730, the points 738A-C represent distortions, due to local structure variances, in the one or more return signals. Such distortions may be difficult to particularly identify in a crowded plot, but subsequent patterns in energy fraction values from the independent components can provide clarity in the separation of the points associated with different variances and therefore different conditions. The patterns in the energy fraction values of one or more independent components may be used to reinforce learning or a hypothesis from a pattern determined in a time domain independent component. For example, an energy fraction of a first component includes indications of a casing collar condition that showed patterns in the time domain graph of the first component; and similarly, the energy fraction of a second component also includes other indications of a casing collar condition that reinforce a pattern in a time domain of the second component.

Figure 7C:
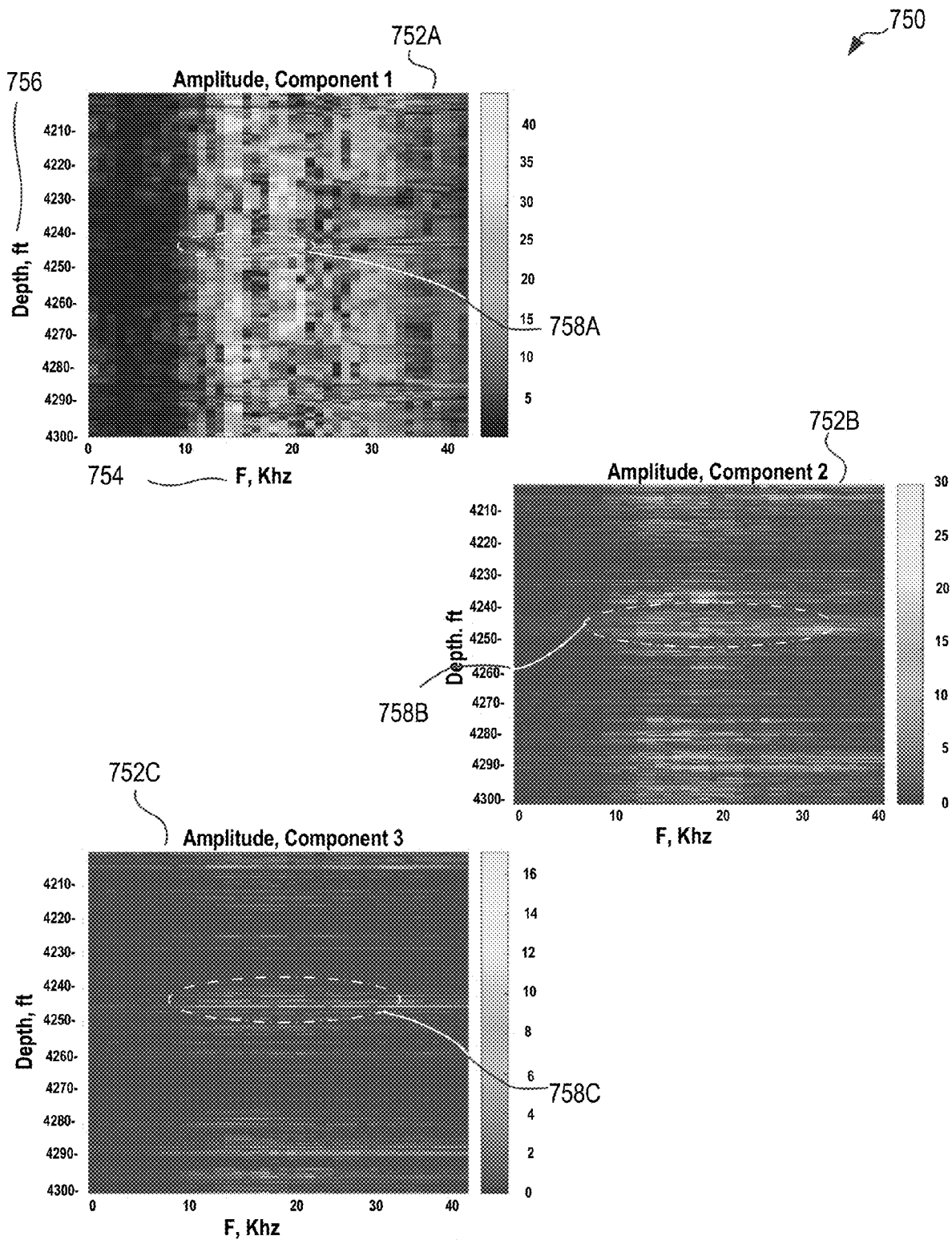
FIG. 7C illustrates frequency domain independent components of a waveform, such as a transformation of the time domain independent components from FIG. 7A, in at least one embodiment herein.

FIG. 7C illustrates, in graphical views 750, frequency domain independent components 752A-C of a waveform, such as a transformation of the time domain independent components from FIG. 7A, in at least one embodiment herein. Each of the frequency domain independent components may be formed from transformation of the time domain components 702A-C is illustrated in the graphical views 700 in FIG. 7A. Particularly, the processor may be caused to perform a step or function for transforming one or more independent components from the multiple components into a frequency domain representation. From all such independent components of FIGS. 7A-7C, the processor can then determine characteristics of the well structure based on the frequency domain representation of the one or more independent components and from the one or more independent components.

At least the first frequency domain components 752A can provide information in the form of variances (illustrated as distortions or points) 758A associated with good cement bonding conditions of a casing. The variances may be cause by formation signals expected in a determined frequency range of 10 and 20 KHz. Further, other ones of the frequency domain components 752B, C may provide unclassified (such as, subtle well structure) variances 758B, C from the waveforms 602 of FIG. 6, where the unclassified variances are associated with an unclassified condition, but may be indicative of further inspection required of the area at the depth indicated in the frequency domain independent component of concern. In one example, an unclassified interval may be as illustrated by points 758B, C that are around any depth in the well structure and may correspond to cement bonding condition in at least one application. An objective measure for the formation signals, which may be indicators for the good cement bonding condition, may be provided by a pattern determined for such frequency domain component values that is between 10 and 20 KHz of any of the frequency domain components 752A-C.

Figure 7D:
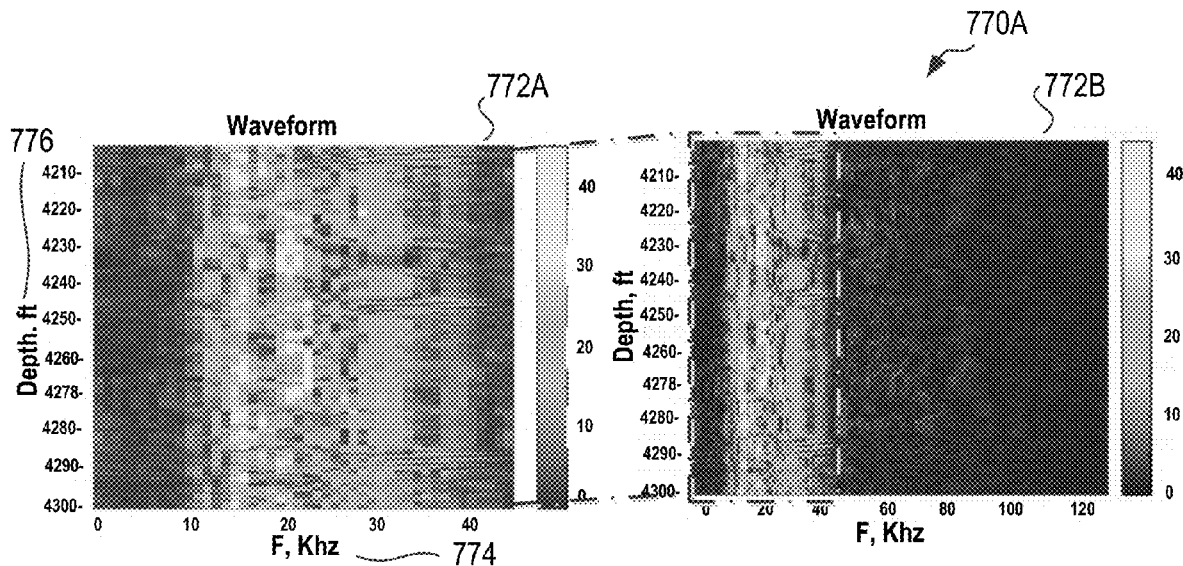
FIG. 7D illustrates zoomed-in and zoomed-out graphical views of frequency domain representations or spectra of the VDL data from FIG. 6, in at least one embodiment herein.

FIG. 7D illustrates zoomed-in 772A and zoomed-out 772B graphical views of frequency domain representations 770A of the VDL data from FIG. 6, in at least one embodiment herein. Frequency 774 is represented on x-axis in Kilohertz (KHz) and depth 776 at which such frequency is noted is represented on the y-axis in feet. The zoomed-in graphical view illustrates the frequency range of focus, in an amplitude spectra, for a frequency domain component 752A-C that may be relevant to well inspection. For example, the zoomed-out graphical view 772B may not capture the distortions or variances as well as the zoomed-in graphical view 772A. As such, at least the zoomed-in graphical view 772A suggests an objective measure from the formation signals using a range of such frequency domain component values that is between 10 and 20 KHz of any amplitude spectra of the frequency domain components 752A-C and patterns associated with distortions within such a frequency spectra.

Figure 7E:
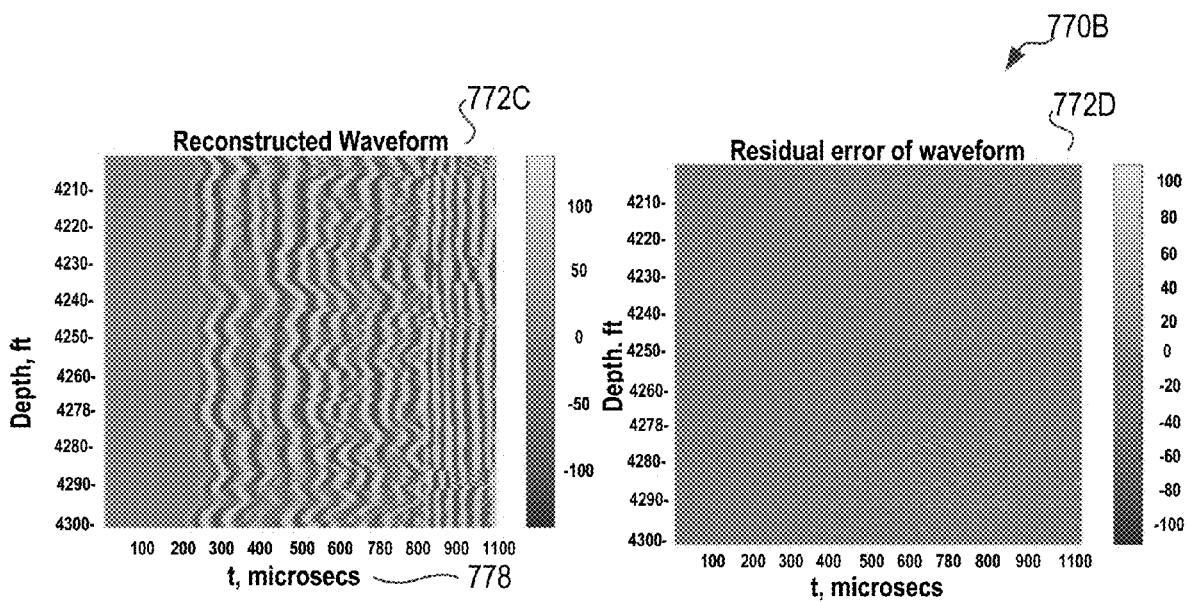
FIG. 7E illustrates a reconstructed graphical view of VDL data and a graphical view of residual error from such reconstructions using at least one of the time domain independent components from FIG. 7A as a source, in at least one embodiment herein.

FIG. 7E illustrates a reconstructed graphical view of VDL data, where such VDL data may be used to provide the time domain graphical view 602 of VDL data in FIG. 6. Different than in FIG. 6, FIG. 7E illustrates that such a time domain graphical view 772C of VDL data may be reconstructed from the independent components.

As such, it is possible to incorporate variations into the independent components to predict other conditions that are or that are related to good cement bonding conditions or to widen or narrow a range of the other conditions that are or that are related to good cement bonding conditions present in at least one actual implementation of a well inspection method and system. This allows for lab-generated data (which may include known well characteristics) to be used with at least one neural network or other machine learning model to make inferences of well conditions for new data from a well inspection tool that uses one or more return signals received by at least one receiver of the well inspection tool, in at least one embodiment herein.

Furthermore, a graphical view 772D is provided of residual error from one such reconstruction, using at least one of the frequency domain independent components, from FIG. 7C as a source, in at least one embodiment herein. This graphical view 772D illustrates that lab-generated data may be effectively used in accurately training a machine learning model, which may then be used with a well inspection tool to enable further independent components and corresponding well structure characteristics (referred to also as known well structure characteristics) for inferencing using new data of one or more return signals.

Figure 8:
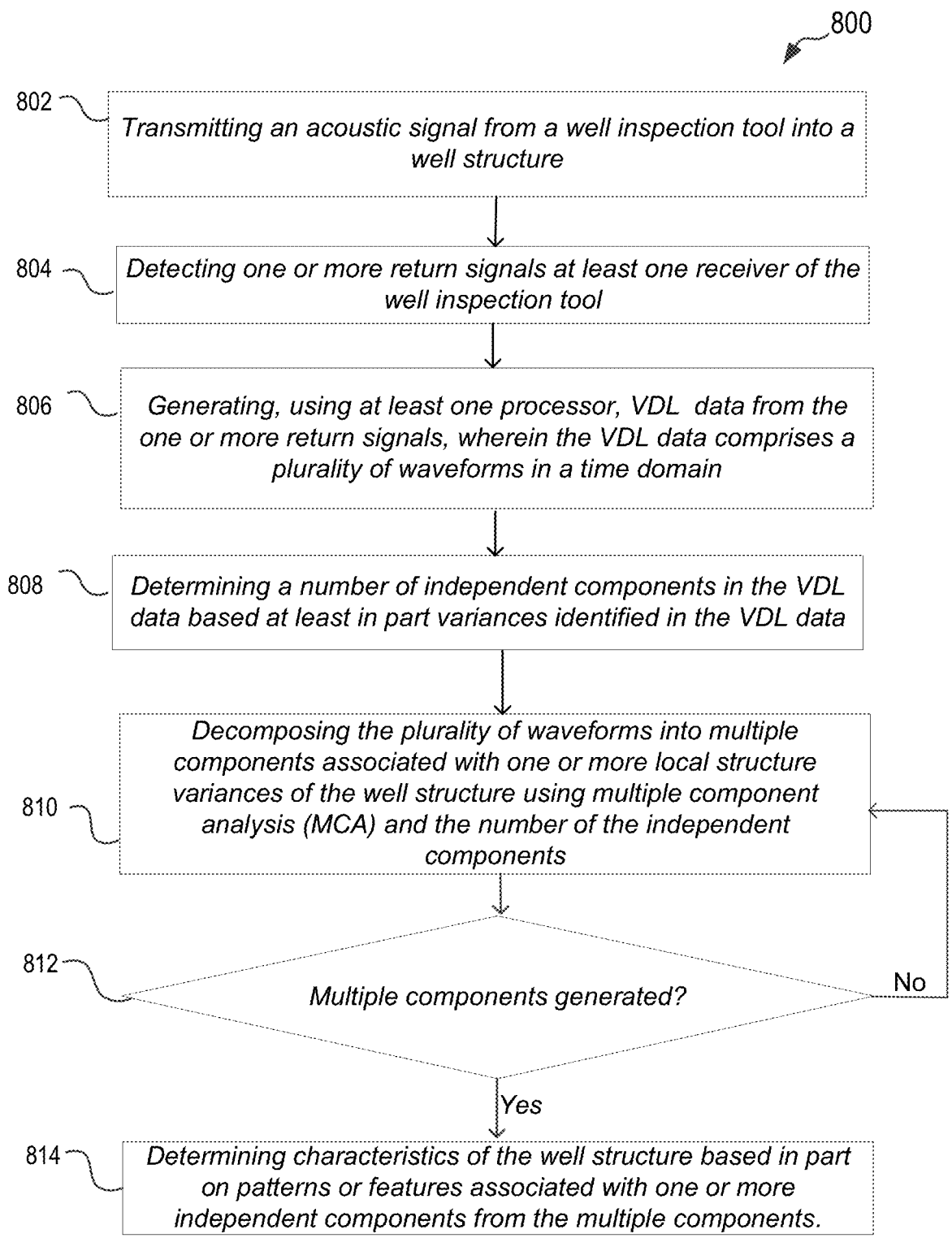
FIG. 8 is a flowchart illustrating a method of well inspection, in accordance with example embodiments.

FIG. 8 is a flowchart illustrating a method 800 of well inspection, in accordance with example embodiments. The method 800 includes transmitting (802) an acoustic signal from a well inspection tool into a well structure. The method 800 includes detecting (804) one or more return signals using at least one receiver of the well inspection tool. A step for generating (806) is included, using at least one processor, for VDL data from the one or more return signals. The VDL data includes multiple waveforms in a time domain. The method (800) includes determining (808) a number of independent components comprised in the VDL data based at least in part variances identified in the VDL data. Such a step (808) may include performing PCA on the VDL data.

Method 800 includes a step for decomposing (810) the multiple waveforms into multiple components using independent component analysis (ICA) and using the number of independent components previously determined (808). The multiple components may be associated with one or more local structure variances of the well structure. A verification (812) may be performed for the multiple components being generated. Otherwise the decomposition (810) may be repeated. The method (800) includes determining (814) characteristics of the well structure based in part on patterns or features associated with one or more independent components from the multiple components.

The method 800 may include verification steps by transforming one or more independent components from the multiple components into a frequency domain representation or by determining energy fractions of the independent components. Then, based on patterns or features in the frequency domain representation of the one or more independent components or based on patterns in the energy fractions, at specified depth(s) and specified time(s), the patterns determined (814) from the one or more independent components in the time domain may be confirmed. Further, such frequency domain patterns or features, or such energy fraction patterns may be used to correct the patterns or features determined (814) from the one or more independent components in the time domain.

Figure 9:
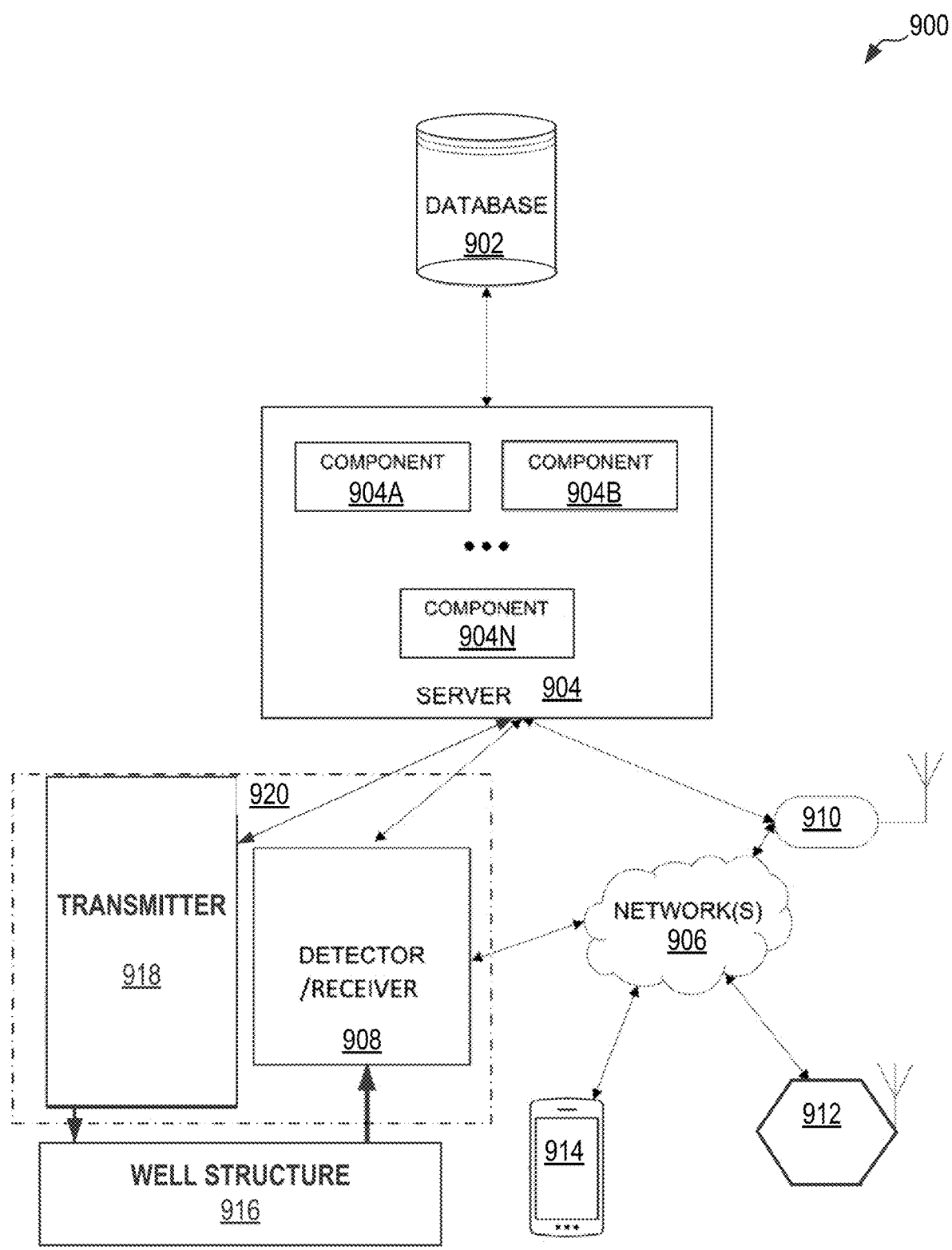
FIG. 9 illustrates computer and network aspects for a system to be used with a method of well inspection, according to at least one embodiment.

In at least one embodiment, computer and network aspects 900 for a downhole system as illustrated in FIG. 9, may be used as described herein. In at least one embodiment, these computer and network aspects 900 may include a distributed system. In at least one embodiment, a distributed system 900 may include one or more computing devices 912, 914. In at least one embodiment, one or more computing devices 912, 914 may be adapted to execute and function with a client application, such as with browsers or a stand-alone application, and are adapted to execute and function over one or more network(s) 906.

In at least one embodiment, a server 904, having components 904A-N may be communicatively coupled with computing devices 912, 914 via network 906 and via a receiver device 908, if provided. In at least one embodiment, components 904A-N include processors, memory and random-access memory (RAM). In at least one embodiment, server 904 may be adapted to operate services or applications to manage functions and sessions associated with database access 902 and associated with computing devices 912, 914. In at least one embodiment, server 904 may be associated with a receiver or detector device 908 of a downhole tool 920.

In at least one embodiment, server 904 may be at a wellsite location, but may also be at a distinct location from a wellsite location. In at least one embodiment, such a server 904 may support a downhole tool or well evaluation tool 920 within a downhole tool. A transmitter 918 provides acoustic signals or waves for a casing of a well structure 916. The receiver or detector device 908 of a downhole tool 920 receiving one or more returned or reflected signals or waves.

In at least one embodiment, a system for well inspection may be directed to well inspect of area behind a casing of a well structure and includes a well inspection tool that is adapted to transmit, either through wires or wirelessly, information received therein, from a detector or a receiver back to the surface. In at least one embodiment, such information may be received in a receiver device and transmitted from there. In at least one embodiment, a server 904 may function as a detector or receiver device but may also perform other functions. In at least one embodiment, one or more component 904A-N may be adapted to function as a detector or receiver device within a server 904. In at least one embodiment, one or more components 904A-N may include one or more processors and one or more memory devices adapted to function as a detector or receiver device, while other processors and memory devices in server 904 may perform other functions.

In at least one embodiment, a server 904 may also provide services or applications that are software-based in a virtual or a physical environment. In at least one embodiment, when server 904 is a virtual environment, then components 904A-N are software components that may be implemented on a cloud. In at least one embodiment, this feature allows remote operation of a system for evaluation of a sheathing behind a casing of a wellbore using a well inspection tool, as discussed at least in reference to FIGS. 1-8. In at least one embodiment, this feature also allows for remote access to information received and communicated between any of aforementioned devices. In at least one embodiment, one or more components 904A-N of a server 904 may be implemented in hardware or firmware, other than a software implementation described throughout herein. In at least one embodiment, combinations thereof may also be used.

In at least one embodiment, one computing device 910-914 may be a smart monitor or a display having at least a microcontroller and memory having instructions to enable display of information monitored by a detector or receiver device. In at least one embodiment, one computing device 910-912 may be a transmitter device to transmit directly to a receiver device or to transmit via a network 906 to a receiver device 908 and to a server 904, as well as to other computing devices 912, 914.

In at least one embodiment, other computing devices 912, 914 may include portable handheld devices that are not limited to smartphones, cellular telephones, tablet computers, personal digital assistants (PDAs), and wearable devices (head mounted displays, watches, etc.). In at least one embodiment, other computing devices 912, 914 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 912, 914 may support applications designed as internet-related applications, electronic mail (email), short or multimedia message service (SMS or MMS) applications and may use other communication protocols. In at least one embodiment, other computing devices 912, 914 may also include general purpose personal computers and/or laptop computers running such operating systems as Microsoft Windows®, Apple Macintosh®, and/or Linux®. In at least one embodiment, other computing devices 912, 914 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 912, 914.

In at least one embodiment, network(s) 906 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 506 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 904 runs a suitable operating system, including any of operating systems described throughout herein. In at least one embodiment, server 504 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 902 is supported by database server feature of a server 904 provided with front-end capabilities. In at least one embodiment, such database server features include those available from Oracle®, Microsoft®, Sybase®, IBM® (International Business Machines), and/or variations thereof.

In at least one embodiment, a server 904 is able to provide feeds and/or real-time updates for media feeds. In at least one embodiment, a server 904 is part of multiple server boxes spread over an area, but functioning for a presently described process for fast in-field chromatography. In at least one embodiment, server 904 includes applications to measure network performance by network monitoring and traffic management. In at least one embodiment, a provided database 902 enables information storage from a wellsite, including user interactions, usage patterns information, adaptation rules information, and other information.

This method (800) is applicable for both fresh and mature wells, even P&A wells with the presence of tubing. Further, this is a robust method (800) to identity the free pipe condition, the existence of a casing collar, the lithology variances of formations, the partially cement bonding conditions, and the natural resonant condition of the pipe. The components associated with formation variances can be characterized with wavelets or spectra, and validated with the gamma ray log.

In some embodiments, the relationships between variance values and corresponding characteristics or status of components of well structure may be established through historical data or lab-generated data. This information may take the form of an index or algorithm. In some embodiments, a machine learning approach may be utilized in which training data includes known variance values and corresponding well structure status. An input of new variance values can produce predicted well structure status information based on the machine learning model trained on such data. Thus, well structure characteristics of the presently inspected well can be determined.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art and are intended to be encompassed within the spirit of the present disclosure disclosed herein and the scope of the appended claims.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two, but can be more when so indicated either explicitly or by context. Further, unless stated otherwise or otherwise clear from context, phrases such as based on means based at least in part on and not based solely on.

Operations of methods 200 and 800 or sub-steps described herein can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages, and can be used in a variety of applications. Various embodiments may be combined or modified based in part on the present disclosure, which is readily understood to support such combination and modifications to achieve the benefits described above.

What is claimed is:

1. A well inspection method, comprising:
   transmitting an acoustic signal from a well inspection tool into a well structure;
   detecting one or more return signals using at least one receiver of the well inspection tool;
   generating, using at least one processor, variable density log (VDL) data from the one or more return signals, wherein the VDL data comprises a plurality of waveforms in a time domain;
   determining a number of independent components comprised in the VDL data based at least in part variances identified in the VDL data;
   decomposing the plurality of waveforms into multiple components using independent component analysis (ICA) and the number of independent components determined in the VDL data, the multiple components associated with one or more local structure variances of the well structure; and
   determining characteristics of the well structure based in part on patterns or features associated with the one or more independent components from the multiple components.

2. The method of claim 1, wherein the characteristics determined of the well structure comprise one or more of: a cement bonding condition, a free pipe condition, or a casing collar condition.

3. The method of claim 1, wherein the one or more local structure variances of the well structure comprise variation of values in a time scale corresponding to a cement bonding condition, a free pipe condition, and a casing collar condition.

4. The method of claim 1, further comprising:
   determining one or more energy fractions from the one or more independent components; and
   applying energy fraction patterns or features within the one or more energy fractions to confirm the patterns or features identified for the one or more independent components.

5. The method of claim 1, further comprising:
   transforming the one or more independent components from the multiple components into a frequency domain representation; and
   determining the characteristics of the well structure based on frequency patterns or features in the frequency domain representation of the one or more independent component.

6. The method of claim 1, further comprising:
   modeling responses associated with the characteristics of the well structure into historical data; and
   enabling further independent components and corresponding well structure characteristics to be determined using the historical data.

7. The method of claim 1, further comprising:
   modeling responses associated with the characteristics of the well structure into lab-generated data by variations applied to the patterns or features associated with the one or more independent components to vary the characteristics of the well structure; and
   enabling further independent components and corresponding well structure characteristics to be determined using the lab-generated data.

8. The method of claim 1, further comprising:
   analyzing the one or more independent components using a machine learning model trained on training data of historical or lab-generated independent components, the historical or lab-generated independent components corresponding to known characteristics of a plurality of well structures; and
   enabling inferences from the machine learning model, the inferences associated with the characteristics of the well structures based in part on one or more known characteristics of a plurality of well structures.

9. The method of claim 1, wherein the VDL log data comprises raw data from multiple receivers, the raw data stored for use as historical data or modified for use as lab-generated data, the historical data or the lab-generated data to generate further independent components that correspond to further well structure characteristics.

10. The method of claim 1, further comprising:
    identifying the variances in the VDL data using principal component analysis (PCA) of the VDL data.

11. A system to be used in well inspection, comprising:
    a transmitter within a well inspection tool to transmit an acoustic signal into a well structure;
    at least one receiver of the well inspection tool to detect one or more return signals; and
    at least one processor to execute instructions to cause the system to:
      generate variable density log (VDL) data from the one or more return signals, wherein the VDL data comprises a plurality of waveforms in a time domain;
      determine a number of independent components comprised in the VDL data based at least in part variances identified in the VDL data;

decompose the plurality of waveforms into multiple components associated with one or more local structure variances of the well structure using independent component analysis (ICA) and the number of independent components determined in the VDL data; and determine characteristics of the well structure based in part on patterns or features associated with one or more independent components from the multiple components.

12. The system of claim 11, wherein the characteristics determined of the well structure comprise one or more of a cement bonding condition, a free pipe condition, or a casing collar condition.

13. The system of claim 11, wherein the one or more local structure variances of the well structure comprise variation of values in a time scale corresponding to a cement bonding condition, a free pipe condition, and a casing collar condition.

14. The system of claim 11, wherein the at least one processor to execute the instructions further causes the system to:

determine one or more energy fractions from the one or more independent components; and apply energy fraction patterns or features, from the one or more energy fractions, to confirm the patterns or features associated with the one or more independent components.

15. The system of claim 11, wherein the at least one processor to execute the instructions further causes the system to:

transform the one or more independent components from the multiple components into a frequency domain representation; and determine the characteristics of the well structure based on frequency patterns or features in the frequency domain representation of the one or more independent component.

16. The system of claim 11, wherein the at least one processor to execute the instructions further causes the system to:

model responses associated with the characteristics of the well structure into historical data; and enable further independent components and corresponding well structure characteristics to be determined using the historical data.

17. The system of claim 11, wherein the at least one processor to execute the instructions further causes the system to:

model responses associated with the characteristics of the well structure into lab-generated data by variations applied to the patterns or features associated with the one or more independent components to vary the characteristics of the well structure; and enable further independent components and corresponding well structure characteristics to be determined using the lab-generated data.

18. The system of claim 11, wherein the at least one processor to execute the instructions further causes the system to:

analyze the one or more independent components using a machine learning model trained on training data of historical or lab-generated independent components, the historical or lab-generated independent components corresponding to known characteristics of a plurality of well structures; and enable inferences from the machine learning model, the inferences associated with the characteristics of the well structures based in part on one or more known characteristics of a plurality of well structures.

19. The system of claim 11, wherein the VDL data comprises raw data from multiple receivers, the raw data stored for use as historical data or modified for use as lab-generated data, the historical data or the lab-generated data to generate further independent components that correspond to further well structure characteristics.

20. The system of claim 11, wherein the at least one processor to execute the instructions further causes the system to:

identify the variances in the VDL data using principal component analysis (PCA) of the VDL data.

* * * * *